US012378419B2

(12) United States Patent
Balk et al.

(10) Patent No.: US 12,378,419 B2
(45) Date of Patent: Aug. 5, 2025

(54) AQUEOUS POLYMER LATEX

(71) Applicant: BASF SE, Ludwigshafen am Rhein (DE)

(72) Inventors: Roelof Balk, Boehl-Iggelheim (DE); Bastiaan Lohmeijer, Ludwigshafen am Rhein (DE); Robert Wrazidlo, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 770 days.

(21) Appl. No.: 17/608,649

(22) PCT Filed: May 7, 2020

(86) PCT No.: PCT/EP2020/062671
§ 371 (c)(1),
(2) Date: Nov. 3, 2021

(87) PCT Pub. No.: WO2020/225348
PCT Pub. Date: Nov. 12, 2020

(65) Prior Publication Data
US 2022/0235229 A1 Jul. 28, 2022

(30) Foreign Application Priority Data
May 8, 2019 (EP) ..................................... 19173298

(51) Int. Cl.
| | | |
|---|---|---|
| *C09D 5/02* | (2006.01) | |
| *C08F 220/18* | (2006.01) | |
| *C08K 3/22* | (2006.01) | |
| *C09D 7/61* | (2018.01) | |
| *C09D 133/06* | (2006.01) | |

(52) U.S. Cl.
CPC ........ *C09D 5/022* (2013.01); *C08F 220/1808* (2020.02); *C08K 3/22* (2013.01); *C09D 7/61* (2018.01); *C09D 133/064* (2013.01); *C08K 2003/2241* (2013.01); *C08K 2003/2296* (2013.01)

(58) Field of Classification Search
CPC .... C09D 5/022; C09D 133/064; C08F 220/18
See application file for complete search history.

(56) References Cited

U.S. PATENT DOCUMENTS

| | | | |
|---|---|---|---|
| 4,636,548 | A | 1/1987 | Kossmann et al. |
| 5,681,880 | A | 10/1997 | Desor et al. |
| 2004/0143065 | A1 | 7/2004 | Holub et al. |
| 2012/0041166 | A1 | 2/2012 | Karikari et al. |
| 2012/0053260 | A1 | 3/2012 | Balk et al. |
| 2012/0077030 | A1 | 3/2012 | Gerst et al. |
| 2017/0275407 | A1 | 9/2017 | Balk et al. |
| 2018/0305471 | A1 | 10/2018 | Balk et al. |

FOREIGN PATENT DOCUMENTS

| | | |
|---|---|---|
| CA | 2829711 A1 | 10/2012 |
| EP | 0192077 A1 | 8/1986 |
| EP | 0709441 A2 | 5/1996 |
| EP | 1302515 A2 | 4/2003 |
| WO | 2005/071023 A1 | 8/2005 |
| WO | 2007/090759 A1 | 8/2007 |
| WO | 2012/130712 A1 | 10/2012 |
| WO | 2016/042116 A2 | 3/2016 |
| WO | 2017/067957 A1 | 4/2017 |

OTHER PUBLICATIONS

Moraes et al., "Evaluation of alternative comonomers for the production of ASE and HASE thickeners", Journal of Colloid and Interface Science, vol. 352, Issue 1, Dec. 1, 2010, pp. 19-29.
International Preliminary Report on Patentability received for PCT Patent Application No. PCT/EP2020/062671, mailed on Apr. 1, 2021, 8 pages.
International Search Report and Written Opinion received for PCT Patent Application No. PCT/EP2020/062671, mailed on Jul. 13, 2020, 9 pages.

*Primary Examiner* — Wenwen Cai
(74) *Attorney, Agent, or Firm* — Faegre Drinker Biddle & Reath LLP

(57) ABSTRACT

Aqueous polymer latexes of film-forming copolymers obtainable by aqueous emulsion polymerisation of at least one non-ionic monomer M1; and
  one or more monoethylenically unsaturated monomers M2;
and where the polymer latex contains an emulsifier comprising
  i. at least one first emulsifier (1), and
  ii. at least one second emulsifier (2).
The present invention also relates to a process for producing such polymer latexes and to the use of these polymer latexes as binders in waterborne coating compositions which contain at least one inorganic tannin blocking compound and to the use of such coating compositions for coating tannin-containing substrates such as wood or wood-based materials.

19 Claims, No Drawings

AQUEOUS POLYMER LATEX

CROSS-REFERENCE TO RELATED APPLICATIONS

This application is a national stage application (under 35 U.S.C. § 371) of PCT/EP2020/062671, filed May 7, 2020, which claims benefit of European Application No. 19173298.1, filed May 8, 2019, both of which are incorporated herein by reference in their entirety.

The present invention relates to aqueous polymer latexes of film-forming copolymers obtainable by aqueous emulsion polymerisation of monomers M, which comprise at least 80% by weight, based on the monomers M, of

- at least one non-ionic monomer M1, which is selected from $C_1$-$C_{20}$-alkyl esters of acrylic acid, $C_5$-$C_{20}$-cycloalkyl esters of acrylic acid, $C_1$-$C_{20}$-alkyl esters of methacrylic acid, $C_5$-$C_{20}$-cycloalkyl esters of methacrylic acid and monovinyl aromatic monomers;
- one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms.

The present invention also relates to a process for producing such polymer latexes and to the use of these polymer latexes as binders in waterborne coating compositions which contain at least one inorganic tannin blocking compound and to the use of such coating compositions for coating tannin-containing substrates such as wood or wood-based materials.

Tannins are water-soluble, phenolic or polyphenolic compounds which occur naturally in woods and give them the characteristic inherent yellow to brown color. Tannins, dissolved by water, may migrate to the wood surface and lead to unattractive discoloration even in coated woods. Therefore, particularly after heavy rainfall in light-colored wood coatings brown runs and yellow knot marks suddenly appear and detract esthetically from the appearance of the coated woods. The phenomenon of color strikethrough may occur not only under wet conditions, such as rainfall, but also even during the application of water-based coating formulations. Indeed, the use of waterborne coating compositions may result in a dissolution of the colored constituents of the wooden substrate, which may migrate into the coating and cause yellow discolorations of the coatings.

In order to counter this behavior, primers are often applied to the wooden substrate, before the top coat is applied. These primers frequently contain inorganic additives, which have a tannin blocking effect. For darker wood varieties such as meranti or lark, it is often necessary to include these additives into the top coat formulation. These inorganic additives are usually based on polyvalent metal salts, for example on the oxides, carbonates, sulfates, acetates, phosphates and phosphosilicates of polyvalent metals, in particular of polyvalent metals selected from zinc, aluminium, zirconium, barium or strontium, optionally in the form of mixed salts or mixed salts with ammonium or potassium. Examples include zinc oxide, ammonium zinc carbonate, zirconium acetate, ammonium zirconium carbonate, potassium zirconium carbonate, ammonium zirconium zinc carbonate, aluminium zirconium phosphosilicate or barium phosphosilicate. These inorganic compounds, which are also termed reactive pigments, are generally quite effective in blocking stains caused by tannins and commercially readily available. In other words, the resulting coatings exhibit significant reduction in the color runs and color strikethrough caused by tannin. Their mode of action is based essentially on their fixing of the water-soluble wood constituents. It is believed that the fixing is mainly caused by the polyvalent metal cations contained therein which likely form water-insoluble complexes with tannins.

However, in practice reactive pigments have some major drawbacks, since they can cause stability problems such as viscosity increase of the coating formulation and polymer coagulation or gelling of the binder latex. It is believed that the polyvalent metal cations contained in these inorganic stain blocking compounds are the root cause for this behavior in forming complexes with carboxylic groups on the latex—as they are intended to do with the wood's polyphenols.

EP 192007 relates to waterborne primer compositions for treating wood, which contains an aqueous polymer latex and a water soluble zinc amine complex with a copolymer styrene and acrylic acid, which effectively improves inhibition of tannin staining. EP 709441 relates to waterborne primer compositions for treating wood, which contains an aqueous polymer latex and a water soluble ammonium zirconium carbonate complex, which effectively improves inhibition of tannin staining. The aforementioned patent applications are limited to primer compositions. Apart from that, the formulation stability is not always satisfactory, and an undesirable increase in viscosity of the primer may be observed upon prolonged storage.

One attempt to resolve this problem includes modifying the composition of the polymer latex binder by incorporating strong acids. EP 1302515, for instance, describes an aqueous coating composition comprising a bimodal polymer latex as a binder, wherein the polymer latex particles contain from 0.1% to 10% by weight of at least one monomer bearing a pendant acid group having a pKa (in water at 20° C.) of less than 4 and salts thereof. However, the incorporation of strong acid groups into the binder can lead to an increased hydrophilicity of the coating, resulting in decreased water barrier properties. Apart from that, it is difficult to reproducibly prepare a bimodal polymer latex of standardized quality in a single polymerization process.

Another attempt to resolve this problem includes the use of specific inorganic nanoparticles as stain blocking agents. For example, WO 2005/071023 describes the use of inorganic nanoparticles having a layered crystal structure with positively charged layers in waterborne primers for wood coatings. The waterborne primers contain commercial polymer latex as a binder. The nanoparticles, however, are commercially not available.

WO 2012/130712 describes polymer dispersions prepared by two-stage emulsion polymerization and the use thereof as a binder in waterborne coating compositions for wood coating. Although the polymer dispersions show good storage stability and the coating compositions prepared therefrom result in coatings having good wet adhesion and good hardness, their compatibility with inorganic tannin blocking agents is not satisfactory.

WO 2016/042116 describes polymer dispersions prepared by two-stage emulsion polymerization in the presence of a copolymerizable emulsifier and the use thereof as a binder in waterborne coating compositions for wood coating. The coating compositions prepared therefrom result in coatings having good water resistance and good hardness. However, they require the use of expensive copolymerizable emulsifiers.

Therefore, it is an object of the present invention to provide polymer latexes, which are particularly useful as binders in waterborne wood coatings, which contain inorganic tannin blocking agents. In particular, the binders should have increased stability against coagulation or gelling when getting into contact with the polyvalent metal ions of the inorganic tannin blocking agents. Moreover, coating compositions containing these binders in combination with the aforementioned inorganic tannin blocking agents should not suffer from an undesirable increase in viscosity upon storage. Apart from that, the polymer latexes should be suitable for being formulated not only in waterborne primers but also in water-borne top coat formulations.

It was surprisingly found that polymer latexes as defined herein solve the above problems. These binders are characterized in particular by containing an emulsifier combination comprising:

i. at least one first emulsifier (1), which is selected from salts, in particular from the alkali metal salts and the ammonium salts of sulfated ethoxylated $C_8$-$C_{20}$-alkanols having a degree of ethoxylation in the range from 5 to 20 and sulfated ethoxylated tristyrylphenols having a degree of ethoxylation in the range from 5 to 20, and ii. at least one second emulsifier (2), which is selected from the salts, in particular from the alkali metal salts and the ammonium salts of a sulfated ethoxylated $C_8$-$C_{20}$-alkanol having a degree of ethoxylation in the range from 21 to 50 and sulfated ethoxylated tristyrylphenols having a degree of ethoxylation in the range from 21 to 50.

Therefore, the present invention relates to an aqueous polymer latex of film forming copolymers, which are obtainable by aqueous emulsion polymerisation of a monomer composition M, where the monomer composition comprises at least 80% by weight, in particular at least 85% by weight, more particularly at least 90% by weight, especially at least 95% by weight, based on the monomers in the monomer composition M, of at least one non-ionic monomer M1, which is selected from $C_1$-$C_{20}$-alkyl esters of acrylic acid, $C_5$-$C_{20}$-cycloalkyl esters of acrylic acid, $C_1$-$C_{20}$-alkyl esters of methacrylic acid, $C_5$-$C_{20}$-cycloalkyl esters of methacrylic acid and monovinyl aromatic monomers;

one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms;

and where the polymer latex contains an emulsifier combination comprising i. at least one first emulsifier (1) as defined herein and
ii. at least one second emulsifier (2) as defined herein.

The present invention also relates to a process for producing the aqueous polymer latexes of the present invention. The process comprises performing an aqueous emulsion polymerisation of the monomers M in the presence of the emulsifier combination.

The present invention also relates to the use of these binders in waterborne coating compositions for tannin containing substrates, in particular in coating compositions, which contain at least one inorganic additive, which has a tannin blocking effect.

Furthermore, the present invention relates to waterborne coating compositions for tannin containing substrates, which contain a) a binder polymer in the form of the aqueous polymer latex as defined herein; and
b) at least one inorganic tannin blocking compound.

The present invention is associated with several benefits. The polymer latexes have increased stability against coagulation when getting into contact with dissolved polyvalent cations, which are present in coating compositions containing inorganic stain blocking agents. In particular, the polymer latexes show a decreased sensitivity against such polyvalent cations, which normally would result in a significant increase in the average particle size of the polymer particles of the polymer latex due to aggregation or partial coagulation. In particular, the polymer latexes tolerate higher concentrations of such polyvalent cations.

Coating compositions containing these binders in combination with the aforementioned inorganic tannin blocking agents do not show an undesirable increase in viscosity upon storage or show such a viscosity increase to a lesser extent.

Coating compositions containing these binders show a very good blocking resistance and provide good chemical resistance and weathering resistance.

The polymer latexes are particularly useful as binders in waterborne wood coatings, which contain inorganic tannin blocking agents and maintain their beneficial properties not only in waterborne primers but also in water-borne top coat formulations.

Here and throughout the specification, the term "(meth) acryl" includes both acryl and methacryl groups. Hence, the term "(meth)acrylate" includes acrylate and methacrylate and the term "(meth)acrylamide" includes acrylamide and methacrylamide.

Here and throughout the specification, the term "waterborne coating composition" means a liquid aqueous coating composition containing water as the continuous phase in an amount sufficient to achieve flowability.

Here and throughout the specification, the terms "wt.-%" and "% by weight (% b.w.)" are used synonymously.

Here and throughout the specification, the term "pphm" means parts by weight per 100 parts of monomers and corresponds to the relative amount in % by weight of a certain monomer based on the total amount of monomers M.

Here and throughout the specification, the terms "ethoxylated" and "polyethoxylated" are used synonymously and refer to compounds having an oligo- or polyoxyethylene group, which is formed by repeating units O—$CH_2CH_2$. In this context, the term "degree of ethoxylation" relates to the number average of repeating units O—$CH_2CH_2$ in these compounds.

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. The term "$C_n/C_m$ alkyl" denominates a mixture of two alkyl groups, one having n carbon atoms while the other having m carbon atoms.

For example, the term $C_1$-$C_{20}$ alkyl denominates a group of linear or branched saturated hydrocarbon radicals having from 1 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, sec-butyl, isobutyl, tert-butyl, 2-methylpropyl (isopropyl), 1,1-dimethylethyl (tert.-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl and in case of nonyl, isononyl, decyl, undecyl, dodecyl, tridecyl, isotridecyl, tetradecyl, pentadecyl, hexadecyl, heptadecyl, octadecyl, nonadecyl, eicosyl, heneicosyl docosyl their isomers, in particular mixtures of isomers such as "isononyl", "isodecyl". Examples of $C_1$-$C_4$-alkyl are for example methyl, ethyl, propyl, 1-methylethyl, butyl, 1-methylpropyl, 2-methylpropyl or 1,1-dimethylethyl.

The term "$C_5$-$C_{20}$-cycloalkyl" as used herein refers to an mono- or bicyclic cycloalkyl radical which is unsubstituted or substituted by 1, 2, 3 or 4 $C_1$-$C_4$-alkyl radicals, e.g. methyl groups, where the total number of carbon atoms of $C_5$-$C_{20}$-cycloalkyl from 5 to 20. Examples of $C_5$-$C_{20}$-alkyl include but are not limited to cyclopentyl, cyclohexyl, methylcyclohexyl, dimethylcyclohexyl, cycloheptyl, cyclooctyl, cyclododecyl, cyclohexadecyl, norbornyl (=bicyclo[2.2.1]heptyl) and isobornyl (=1,7,7-trimethylbicyclo[2.2.1]heptyl).

The term "tristyrylphenol" relates to a compound of the formula A, in particular to the compound of the formula B and in especially to the compound 2,4,6-tris(1-phenylethyl) phenol.

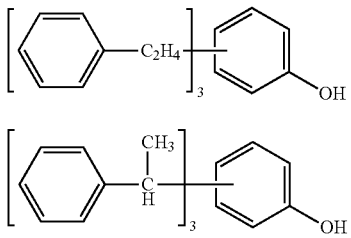

A

B

The term "tristyrylphenyl" relates to a compound of the formula A', in particular to the radical of the formula B' and in especially to the radical 2,4,6-tris(1-phenylethyl)phenyl, where * in formulae A' and B' indicates the point of attachment of the tristyrylphenyl radical.

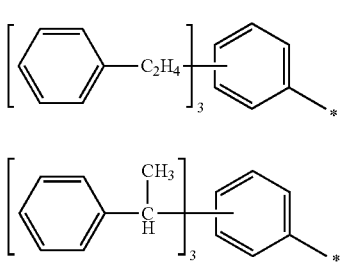

A'

B'

According to the invention, the polymer latex contains a combination of at least two different anionic emulsifiers (1) and (2), which are selected from the group consisting of
 i) the salts, in particular the ammonium salts and the alkali metal salts of sulfated ethoxylated $C_8$-$C_{20}$-alkanols, which sometimes are also termed $C_8$-$C_{20}$-alkyl ether sulfates or $C_8$-$C_{20}$-alkanol ether sulfates; and
 ii) the salts, in particular the ammonium salts and the alkali metal salts of sulfated ethoxylated tristyrylphenols, which are also termed tristyrylphenol ethoxylate sulfates or tristyrylphenol ether sulfates.

In emulsifier (1), the degree of ethoxylation is in the range from 5 to 20, in particular in the range from 7 to 17, especially in the range from 10 to 15, while in emulsifier (2), the degree of ethoxylation is in the range from 21 to 50, in particular in the range from 22 to 40 and especially in the range from 25 to 35.

Both emulsifiers (1) and (2) can be described by the following formula (I):

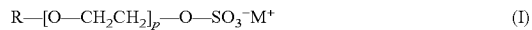

$$R-[O-CH_2CH_2]_p-O-SO_3^- M^+ \quad (I)$$

where
R represents an alkyl radical having from 8 to 20 carbon atoms or a tristyrylphenyl radical;
$M^+$ represents an ammonium or alkali metal ion, in particular an ammonium ion or an alkali metal ion selected from sodium and potassium ions and especially an ammonium or a sodium ion,
p represents the number of repeating units O—$CH_2CH_2$, which depends on whether formula (I) describes emulsifier (1) or emulsifier (2), respectively.

A skilled person immediately appreciates that sulfated ethoxylated $C_8$-$C_{20}$-alkanols as well as sulfated ethoxylated tristyrylphenols are usually mixtures of different molecules of the formula (I), which differ in particular by the number of repeating units O—$CH_2CH_2$. A skilled person will also appreciate that the number average of p corresponds to the degree of ethoxylation. Thus, the emulsifier (1) relates to mixtures of compounds of the formula (I), where the number average of p is in the range from 5 to 20, in particular in the range from 7 to 17, especially in the range from 10 to 15, while the emulsifier (2) relates to mixtures of compounds of the formula (I), where the number average of p is in the range from 21 to 50, in particular in the range from 22 to 40 and especially in the range from 25 to 35. In any case, the integer p of formula (I) is usually in the range from 2 to 80, especially in the range from 3 to 70.

Amongst the emulsifiers (1) the ammonium salts and the alkali metal salts of $C_{10}$-$C_{20}$-alkyl ether sulfates, in particular of $C_{10}$-$C_{18}$-alkyl ether sulfates, especially of $C_{12}$-$C_{16}$-alkyl ether sulfates are preferred, i.e. those compounds formula (I), where the alkyl radical R has from 10 to 18 carbon atoms, in particular from 12 to 16 carbon atoms, i.e. R is $C_{10}$-$C_{18}$ alkyl, in particular $C_{12}$-$C_{16}$-alkyl.

Amongst the emulsifiers (2) the ammonium salts and the alkali metal salts of $C_{10}$-$C_{18}$-alkyl ether sulfates, in particular of $C_{12}$-$C_{16}$-alkyl ether sulfates are preferred, i.e. those compounds formula (I), where the alkyl radical R has from 10 to 18 carbon atoms, in particular from 12 to 16 carbon atoms, i.e. R is $C_{10}$-$C_{18}$ alkyl, in particular $C_{12}$-$C_{16}$-alkyl. Amongst the emulsifiers (2) the ammonium salts and the alkalimetal salts of sulfated ethoxylated tristyrylphenols having a degree of ethoxylation in the range from 21 to 50 are also preferred.

Amongst the emulsifiers (1) the ammonium salts and the alkali metal salts of $C_8$-$C_{20}$-alkyl ether sulfates, in particular of $C_{10}$-$C_{18}$-alkyl ether sulfates, in particular of $C_{12}$-$C_{16}$-alkyl ether sulfates are preferred, where the alkyl radical is linear, i.e. those compounds formula (I), where the alkyl radical R is a linear alkyl radical having from 8 to 20 carbon atoms, in particular from 10 to 18 carbon atoms, especially from 12 to 16 carbon atoms, i.e. R is linear $C_8$-$C_{20}$ alkyl, in particular $C_{10}$-$C_{13}$-alkyl, especially $C_{12}$-$C_{16}$-alkyl.

Amongst the emulsifiers (2) the ammonium salts and the alkali metal salts of $C_8$-$C_{20}$-alkyl ether sulfates, in particular of $C_{10}$-$C_{13}$-alkyl ether sulfates, in particular of $C_{12}$-$C_{16}$- alkyl ether sulfates are preferred, where the alkyl radical is linear, i.e. those compounds formula (I), where the alkyl radical R is a linear alkyl radical having from 8 to 20 carbon atoms, in particular from 10 to 18 carbon atoms, especially from 12 to 16 carbon atoms, i.e. R is linear $C_8$-$C_{20}$ alkyl, in particular $C_{10}$-$C_{13}$-alkyl, especially $C_{12}$-$C_{16}$-alkyl.

Amongst the emulsifiers (1) and (2), the ammonium salts and the sodium salts of $C_8$-$C_{20}$-alkyl ether sulfates, in particular of $C_{10}$-$C_{13}$-alkyl ether sulfates, in particular of $C_{12}$-$C_{16}$-alkyl ether sulfates are especially preferred.

Particular preference is given to emulsifiers (1), which are selected from the ammonium salts and the sodium salts of $C_{10}$-$C_{13}$-alkyl ether sulfates, in particular of $C_{12}$-$C_{16}$-alkyl ether sulfates, where the degree of ethoxylation is in the range from 7 to 17, especially in the range from 10 to 15.

Particular preference is given to emulsifiers (2), which are selected from the ammonium salts and the sodium salts of $C_{10}$-$C_{13}$-alkyl ether sulfates, in particular of $C_{12}$-$C_{16}$-alkyl ether sulfates, where the degree of ethoxylation is in the range from 22 to 40 and especially in the range from 25 to 35.

The ammonium and alkali metal salts of alkylether sulfates are well known and commercially available, e.g. the Disponil® FES types of BASF SE, such as Disponil® FES 430, Disponil® FES 993, Disponil® FES 77, Disponil® FES 61, the Disponil® BES types of BASF SE, such as Disponil® BES 20, the Sulfochem® AES types of Lubrizol, the Emulsogen® types of Clariant, the Rhodapex® types and Abex® types of Solvay (former Rhodia).

The ammonium and alkali metal salts of tristyrylphenol ether sulfates are well known and commercially available, e.g. Soprophor® 4D384 of Solvay (former Rhodia) or Lucramul® SPS types, such as Lucramul® SPS-16 and Lucramul® SPS-29 of Levaco.

For the purposes of the invention, it has been found beneficial, if the weight ratio of the first emulsifier (1) to the second emulsifier (2) is in the range from 15:85 to 70:30, in particular in the range from 25:75 to 60:40.

In the emulsifier composition the emulsifiers (1) and (2) may be the sole emulsifiers. However, the polymer latex may also contain minor amounts of emulsifiers, which are different from emulsifiers (1) and (2). Such emulsifiers may be anionic or non-ionic.

Examples of such anionic emulsifiers include, but are not limited to anionic emulsifiers, which bear at least one anionic group selected from sulfate, sulfonate group, phosphonate and phosphate groups, for example, the salts, especially the alkali metal and ammonium salts, of alkyl sulfates, especially of $C_8$-$C_{22}$-alkyl sulfates, the salts, especially the alkali metal and ammonium salts, of sulfuric monoesters of ethoxylated alkylphenols, especially of sulfuric monoesters of ethoxylated $C_4$-$C_{13}$-alkylphenols (EO level preferably 3 to 40), the salts, especially the alkali metal and ammonium salts, of alkylsulfonic acids, especially of $C_8$-$C_{22}$-alkylsulfonic acids, the salts, especially the alkali metal and ammonium salts, of dialkyl esters, especially di-$C_4$-$C_{13}$-alkyl esters of sulfosuccinic acid, the salts, especially the alkali metal and ammonium salts, of alkylbenzenesulfonic acids, especially of $C_4$-$C_{22}$-alkylbenzenesulfonic acids, and the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company);

the salts, especially the alkali metal and ammonium salts, of mono- and dialkyl phosphates, especially $C_8$-$C_{22}$-alkyl phosphates, the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, the salts, especially the alkali metal and ammonium salts, of phosphoric monoesters of ethoxylated alkylphenols, especially phosphoric monoesters of ethoxylated $C_4$-$C_{13}$-alkylphenols (EO level preferably 3 to 40), the salts, especially the alkali metal and ammonium salts, of alkylphosphonic acids, especially $C_8$-$C_{22}$-alkylphosphonic acids and the salts, especially the alkali metal and ammonium salts, of alkylbenzenephosphonic acids, especially $C_4$-$C_{22}$-alkylbenzenephosphonic acids.

Examples of such nonionic emulsifiers include, but are not limited to ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$)

ethoxylated tristyrylphenole (EO level: 3 to 50, alkyl radical: tristyrylphenyl), and polyethylene oxide/polypropylene oxide homo- and copolymers. These may comprise the alkylene oxide units copolymerized in random distribution or in the form of blocks.

For the purpose of the invention it has been found beneficial, if the total amount of emulsifiers, which are different from the emulsifiers (1) and (2) does not exceed 20% by weight, in particular 10% by weight, especially 5% by weight, based on the total amount of emulsifiers present in the polymer latex of the invention. In other words, the total amount of first emulsifier (1) and the second emulsifier is at least 80% by weight, in particular at least 90% by weight and especially at least 95% by weight, based on the total amount of emulsifiers contained in the polymer latex.

For the purposes of the invention it has been found beneficial, if the total amount of emulsifiers present in the aqueous polymer latex is in the range from 0.1 to 5% by weight, in particular in the range from 0.2 to 4% by weight, especially 0.3 to 3% by weight, based on the film-forming copolymer contained in the polymer latex.

For the purposes of the invention it has been found beneficial, if the particles of the copolymer contained in the polymer latex have a Z-average particle diameter in the range from 40 to 500 nm, in particular in the range from 50 to 350 nm, as determined by quasi-elastic light scattering.

If not stated otherwise, the size of the particles as well as the distribution of particle size is determined by quasielastic light scattering (QELS), also known as dynamic light scattering (DLS). The measurement method is described in the ISO 13321:1996 standard. The determination can be carried out using a High-Performance Particle Sizer (H PPS). For this purpose, a sample of the aqueous polymer latex will be diluted and the dilution will be analyzed. In the context of QELS, the aqueous dilution may have a polymer concentration in the range from 0.001 to 0.5% by weight, depending on the particle size. For most purposes, a proper concentration will be 0.01% by weight. However, higher or lower concentrations may be used to achieve an optimum signal/noise ratio. The dilution can be achieved by addition of the polymer latex to water or an aqueous solution of a surfactant in order to avoid flocculation. Usually, dilution is performed by using a 0.1% by weight aqueous solution of a non-ionic emulsifier, e.g. an ethoxylated C16/C18 alkanol (degree of ethoxylation of 18), as a diluent. Measurement configuration: HPPS from Malvern, automated, with continuous-flow cuvette and Gilson autosampler. Parameters: measurement temperature 20.0° C.; measurement time 120 seconds (6 cycles each of 20 s); scattering angle 173°; wavelength laser 633 nm (HeNe); refractive index of medium 1.332 (aqueous); viscosity 0.9546 mPa-s. The measurement gives an average value of the second order cumulant analysis (mean of fits), i.e. Z average. The "mean of fits" is an average, intensity-weighted hydrodynamic particle diameter in nm.

The hydrodynamic particle diameter can also be determined by Hydrodynamic Chromatography fractionation (HDC), as for example described by H. Wiese, "Characterization of Aqueous Polymer Dispersions" in Polymer Dispersions and Their Industrial Applications (Wiley-VCH, 2002), pp. 41-73. For further details reference is made to the examples and the description below.

In a particular group of embodiments, the particles of the copolymer contained in the polymer latex have a Z-average particle diameter, as determined by QELS, in the range from 40 to 200 nm, in particular in the range from 50 to 150 nm. In this particular group of embodiments, the particle size distribution of the copolymer particles contained in the polymer latex is in particular monomodal or almost monomodal, which means that the distribution function of the particle size has a single maximum.

In another particular group of embodiments, the particles of the copolymer contained in the polymer latex have a Z-average particle diameter, as determined by QELS, in the range from 150 to 500 nm, in particular in the range from 200 to 400 nm. In this particular group of embodiments, the particle size distribution of the copolymer particles contained in the polymer latex is in particular polymodal, in particular bimodal, which means that the distribution function of the particle size has at least two maxima. Usually, the particle size distribution, as determined by QELS, of the polymer particles in the polymer dispersion obtainable by the process as described herein has a first maximum in the range of 30 to 150 nm and a second maximum in the range of 200 to 500 nm. Preferably, said first maximum is in the range of 50 to 130 nm and said second maximum is in the range of 200 to 400 nm.

According to the invention, the polymer latex is obtainable by aqueous emulsion polymerisation of monomers M, which comprise at least 90% by weight, based on the monomers M, of a combination of at least one monomer M1 and at least one monomer M2 as defined herein. As the polymerized monomers form the polymer latex particles, it is apparent that the following statements with regard to the kind of monomers comprised by the monomers and the relative amounts of the different monomers M will also apply to the polymer latex particles.

According to the invention, the monomers M1 are selected from the group consisting of $C_1$-$C_{20}$-alkyl esters of acrylic acid, $C_5$-$C_{20}$-cycloalkyl esters of acrylic acid, $C_1$-$C_{20}$-alkyl esters of methacrylic acid, $C_5$-$C_{20}$-cycloalkyl esters of methacrylic acid and vinyl aromatic monomers.

Suitable $C_1$-$C_{20}$-alkyl esters of acrylic acid include but are not limited to methyl acrylate, ethyl acrylate, n-propyl acrylate, isopropyl acrylate, n-butyl acrylate, sec-butyl acrylate, isobutyl acrylate, tert-butyl acrylate, n-pentyl acrylate, n-hexyl acrylate, n-octyl acrylate, 2-ethylhexyl acrylate, n-decyl acrylate, isodecyl acrylate, 2-propylheptyl acrylate, lauryl acrylate, $C_{12}$/$C_{14}$-alkyl acrylate, $C_{12}$-$C_{15}$-alkyl acrylate, isotridecyl acrylate, $C_{16}$/$C_{18}$-alkyl acrylate and stearyl acrylate.

Suitable $C_5$-$C_{20}$-cycloalkyl esters of acrylic acid include but are not limited to cyclohexylacrylate, norbornylacrylate and isobornylacrylate.

Suitable $C_1$-$C_{20}$-alkyl esters of methacrylic acid include but are not limited to
- $C_1$-$C_4$-alkyl esters of methacrylic acid, such as methyl methacrylate, ethyl methacrylate, n-propyl methacrylate, isopropyl methacrylate, n-butyl methacrylate, sec-butyl methacrylate, isobutyl methacrylate and tert-butyl methacrylate; and
- $C_5$-$C_{20}$-alkyl esters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}$/$C_{14}$-alkyl methacrylate, $C_{12}$-$C_{15}$-alkyl methacrylate, isotridecyl methacrylate, $C_{16}$/$C_{18}$-alkyl methacrylate and stearyl methacrylate;
and mixtures thereof.

Suitable $C_5$-$C_{16}$-cycloalkyl esters of methacrylic acid include but are not limited to cyclohexyl methacrylate, norbornyl methacrylate and isobornyl methacrylate.

Suitable vinyl aromatic monomers include but are not limited to mono-vinyl substituted aromatic hydrocarbons such as styrene, 2-methylstyrene, 4-methylstyrene, 2-n-butylstyrene, 4-n-butylstyrene, 4-n-decylstyrene and α-methylstyrene, with particular preference given to styrene.

Preferably, monomers M1 are selected from the group consisting of
- $C_2$-$C_{10}$-alkyl esters of acrylic acid,
  in particular ethyl acrylate, n-butyl acrylate, tert-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexylacrylate or mixtures of n-butyl acrylate and ethyl acrylate or mixtures of ethyl acrylate, n-butyl acrylate, tert-butyl acrylate and 2-ethylhexyl acrylate;
- $C_1$-$C_4$-alkyl esters of methacrylic acid,
  in particular methyl methacrylate;
- monovinyl aromatic monomers, especially styrene.

Preferably, the monomers M1 are a mixture of
- at least one monomer M1a, selected from $C_1$-$C_{20}$-alkyl esters of acrylic acid and $C_5$-$C_{20}$-alkyl esters of methacrylic acid; and
- at least one monomer M1b, selected from monovinyl aromatic monomers, and $C_1$-$C_4$-alkyl esters of methacrylic acid and mixtures thereof.

More particularly, the monomers M1 are a mixture of
- at least one monomer M1a, selected from $C_2$-$C_{10}$-alkyl esters of acrylic acid, such as ethyl acrylate, n-butyl acrylate, n-hexyl acrylate, n-octyl acrylate, 2-ethylhexyl acrylate, 2-propylheptyl acrylate and mixtures thereof; and at least one monomer M1b, selected from monovinyl aromatic monomers, such as styrene, and $C_1$-$C_4$-alkyl esters of methacrylic acid, such as methyl methacrylate, and mixtures thereof.

Especially, the monomers M1 are a mixture of
at least one monomer M1a, selected from $C_2$-$C_{10}$-alkyl esters of acrylic acid; and
at least one monomer M1b, selected from styrene and methyl methacrylate and mixtures thereof.

Preference it given to monomers M1, which comprise less than 20%, in particular not more than 10% by weight, especially not more than 10% by weight, based on the total amount of monomers M, of monovinyl aromatic monomers. In particular, the monomers M1 do not contain vinyl aromatic monomers at all.

Therefore, in a preferred group of embodiments the monomers M1 are selected from the group consisting of
at least one monomer M1a, selected from $C_1$-$C_{20}$-alkyl esters of acrylic acid and $C_5$-$C_{20}$-alkyl esters of methacrylic acid and mixtures thereof; and
at least one monomer M1b, selected from $C_1$-$C_4$-alkyl esters of methacrylic acid monomers and mixtures thereof.

In particular, the monomers M1 are a mixture of
$C_2$-$C_{10}$-alkyl esters of acrylic acid, in particular ethyl acrylate, n-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexylacrylate or mixtures of n-butyl acrylate and ethyl acrylate or mixtures of ethyl acrylate, n-butyl acrylate and 2-ethylhexyl acrylate;
$C_1$-$C_4$-alkyl esters of methacrylic acid, in particular methyl methacrylate.

More particularly, the monomers M1 are a mixture of
at least one monomer M1a, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and
at least one monomer M1b, selected from $C_1$-$C_4$-alkyl esters of methacrylic acid, in particular methyl methacrylate.

In the mixtures of monomers M1a and M1b, the relative amount of M1a and M1b may vary in particular from 10:1 to 1:10, more particularly from 5:1 to 1:5, especially from 3:1 to 1:3. The ratio of monomers M1a to M1b will affect the glass transition temperature and a proper mixture will result in the desired glass transition temperatures.

The total amount of monomers M1 is frequently from 80 to 99.95% by weight or from 80 to 99.9% by weight, in particular from 80 to 99.8% by weight or from 85 to 99.8% by weight or from 90 to 99.8% by weight and especially from 85 to 99.5% by weight or from 90 to 99.5% by weight, based on the total weight of the monomers M.

According to a preferred embodiment, the at least one monoethylenically unsaturated monomer M2 is selected from monoethylenically unsaturated acidic monomers and their salts. The acidic monomers M2 are selected from the group consisting of monoethylenically unsaturated monocarboxylic acids having 3 to 6 carbon atoms and monoethylenically unsaturated dicarboxylic acids having 4 to 6 carbon atoms.

Suitable monomers M2 include, but are not limited to
monoethylenically unsaturated monocarboxylic acids having 3 to 6 carbon atoms, such as acrylic acid, methacrylic acid, crotonic acid, 2-ethylpropenoic acid, 2-propylpropenoic acid, 2-acryloxyacetic acid and 2-methacryloxyacetic acid;
monoethylenically unsaturated dicarboxylic acids having 4 to 6 carbon atoms, such as itaconic acid and fumaric acid.

Amongst the aforementioned monomers M2, preference is given to monocarboxylic acids. Particular preference is given to acrylic acid, methacrylic acid and mixtures thereof. In a particular group of embodiments, the monomer M2 comprises methacrylic acid. Especially, the monomer M2 is methacrylic acid or a mixture of acrylic acid and methacrylic acid.

The total amount of monomers M2 is generally from 0.05 to 10% by weight, in particular from 0.1 to 5% by weight, preferably from 0.2 to 5% by weight, especially from 0.5 to 4% by weight, based on the total weight of the monomers M.

Optionally, the monomers M may further comprise at least one nonionic monoethylenically unsaturated monomer M3, which preferably has a functional group selected from hydroxyalkyl groups, in particular hydroxy-$C_2$-$C_4$-alkyl group, a primary carboxamide group, urea groups and keto groups. Suitable non-ionic monomers are also monoethylenically unsaturated monomers bearing a silan functional group and monoethylenically unsaturated monomers bearing an oxirane group.

The total amount of monomers M3 will usually not exceed 20% by weight, in particular 15% by weight, especially 10% by weight or 5% by weight, based on the total amount of monomers M. In particular, the total amount of monomers M3, if present, is generally from 0.05 to 20% by weight, in particular from 0.1 to 15% by weight, preferably from 0.2 to 10% by weight, especially from 0.5 to 5% by weight, based on the total weight of the monomers M.

Examples for monomers M3 having a carboxamide group (hereinafter monomers M3a) include, but are not limited to primary amides of monoethylenically unsaturated monocarboxylic acids having 3 to 6 carbon atoms, such as acrylamide and methacrylamide.

Examples for monomers M3 having a urea group (hereinafter monomers M3b) are the $C_1$-$C_4$-alkyl esters of acrylic acid or methacrylic acid and the N—$C_1$-$C_4$-alkyl amides of acrylic acid or methacrylic acid, where the $C_1$-$C_4$-alkyl group bears an urea group or a 2-oxoimidazolin group such as 2-(2-oxo-imidazolidin-1-yl)ethyl acrylate, 2-(2-oxo-imidazolidin-1-yl)ethyl methacrylate, which are also termed 2-ureido acrylate and 2-ureido methacrylate, respectively, N-(2-acryloxyethyl)urea, N-(2-methacryloxyethyl)urea, N-(2-(2-oxo-imidazolidin-1-yl)ethyl) acrylamide, N-(2-(2-oxo-imidazolidin-1-yl)ethyl) methacrylamide, as well as allyl or vinyl substituted ureas and allyl or vinyl substituted 2-oxoimidazolin compounds such as 1-allyl-2-oxoimidazolin, N-allyl urea and N-vinylurea.

Examples for monomers M3 having a keto group (hereinafter monomers M3c) are the
$C_2$-$C_8$-oxoalkyl esters of acrylic acid or methacrylic acid and the N—$C_2$-$C_8$-oxoalkyl amides of acrylic acid or methacrylic acid, such as diacetoneacrylamide (DAAM), and diacetonemethacrylamide, and
$C_1$-$C_4$-alkyl esters of acrylic acid or methacrylic acid and the N—$C_1$-$C_4$-alkyl amides of acrylic acid or methacrylic acid, where the $C_1$-$C_4$-alkyl group bears a 2-acetylacetoxy group of the formula O—C(=O)—$CH_2$—C(=O)—$CH_3$ (also termed acetoacetoxy group), such as acetoacetoxyethyl acrylate, acetoacetoxypropyl methacrylate, acetoacetoxybutyl methacrylate and 2-(acetoacetoxy)ethyl methacrylate.

Suitable monomers M3 also include monoethylenically unsaturated silan functional monomers (hereinafter monomers M3d), e.g. monomers which in addition to an ethylenically unsaturated double bond bear at least one mono-, di- and/or tri-$C_1$-$C_4$-alkoxysilane group, such as vinyl trimethoxysilane, vinyl triethoxysilane, methacryloxyethyl trimethoxysilane, methacryloxyethyl triethoxysilane, and mixtures thereof. The amount of silan functional monomers, if present, will usually not exceed 1 pphm, and frequently be in the range from 0.01 to 1 pphm.

Suitable monomers M3 may also include monoethylenically unsaturated monomers bearing at least one epoxy group (hereinafter monomers M3e), in particular a glycidyl group such as glycidyl acrylate and glycidyl metharylate.

The monomers M may also include multiethylenically unsaturated monomers (monomers M3f), i.e. monomers having at least two non-conjugated ethylenically unsaturated double bounds. The amounts of said monomers M3f will generally not exceed 1 pphm based on the amount of monomers forming the polyfunctional polymer.

Examples of multiethylenically unsaturated monomers M3f include:
- diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol), 1,6-hexanediol and 1,2-cyclohexanediol;
- monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol, such as allyl acrylate and allyl methacrylate; and
- divinyl aromatic compounds, such as 1,3-divinyl benzene, 1,4-divinyl benzene.

In particular, the monomers M3 are selected from primary amides of monoethylenically unsaturated monocarboxylic acids, in particular acrylamide and methacrylamide, monomers having a urea group, especially 2-ureido acrylate, 2-ureido methacrylate, and mixtures thereof and monomers bearing a carbonyl group, especially diacetoneacrylamide (DAAM), diacetonemethacrylamide and mixtures thereof.

In particular the monomers M consist of:
- 80 to 99.95% by weight or from 80 to 99.9% by weight, in particular from 80 to 99.8% by weight or from 85 to 99.8% or from 85 to 99.5% by weight, and especially from 85 to 99.5% by weight or from 85 to 99% by weight or from 90 to 99.5% by weight or from 90 to 99.0% by weight, based on the total weight of the monomers contained in the monomer composition M, of ethylenically unsaturated monomers M1;
- 0.05 to 10% by weight, in particular from 0.1 to 5% by weight, preferably from 0.2 to 5% by weight, especially from 0.5 to 4% by weight, based on the total weight of the monomers contained in the monomer composition M, of one or more monoethylenically unsaturated monomers M2;
- 0 to 19.95% by weight, e.g. from 0.05 to 19.95% by weight, in particular from 0.1 to 14.95% by weight or from 0.1 to 14.9% by weight or from 0.1 to 14.8% by weight or from 0.1 to 14.5% by weight, preferably from 0.2 to 9.8% by weight or from 0.2 to 9.5% by weight, especially from 0.5 to 4.9% by weight or from 0.5 to 4.8% by weight or from 0.5 to 4.5% by weight, based on the total weight of the monomers contained in the monomer composition M, of one or more non-ionic monomers M3.

The copolymer contained in the polymer particles may form a single phase or it may form different phases, if the polymer particles contain different copolymers, which differ with regard to their monomer composition. Preferably, the polymer particles contained in the aqueous polymer latex of the present invention, comprises at least one phase, where the copolymer has a glass transition temperature Tg which does not exceed 60° C., in particular is at most 50° C., e.g. in the range from –25 to +60° C., in particular in the range from –10 to +50° C.

The glass transition temperatures as referred to herein are the actual glass transition temperatures. The actual glass transition temperature can be determined experimentally by the differential scanning calorimetry (DSC) method according to ISO 11357-2:2013, preferably with sample preparation according to ISO 16805:2003.

According to a particular preferred group of embodiments of the invention, the polymer particles contained in the aqueous polymer latex of the present invention, comprises a first phase (1) of a copolymer, which has a glass transition temperature Tg(1) in the range from –25 to +60° C., in particular in the range from –10 to +50° C. and a second phase (2) of a copolymer, which has a glass transition temperature Tg(2) in the range from +50 to +150° C., in particular in the range from +60 to +120° C., provided that the temperature difference |Tg(2)–Tg(1)| is at least 10° C., i.e., the absolute value of |Tg(2)–Tg(1)| is at least 10° C., in particular at least 20° C., especially at least 40° C.

The actual glass transition temperature depends from the monomer compositions forming the respective polymer phases (1) and (2), respectively, and a theoretical glass transition temperature can be calculated from the monomer composition used in the emulsion polymerization. The theoretical glass transition temperatures are usually calculated from the monomer composition by the Fox equation:

$$1/Tg^f = x_a/Tg_a + x_b/Tg_b + \ldots x_n/Tg_n,$$

In this equation $x_a, x_b, \ldots x_n$ are the mass fractions of the monomers a, b, ... n and $Tg_a, Tg_b, \ldots Tg_n$ are the actual glass transition temperatures in Kelvin of the homopolymers synthesized from only one of the monomers 1, 2, ... n at a time. The Fox equation is described by T. G. Fox in Bull. Am. Phys. Soc. 1956, 1, page 123 and as well as in Ullmann's Encyclopädie der technischen Chemie [Ullmann's Encyclopedia of Industrial Chemistry], vol. 19, p. 18, 4th ed., Verlag Chemie, Weinheim, 1980. The actual Tg values for the homopolymers of most monomers are known and listed, for example, in Ullmann's Encyclopädie der technischen Chemie [Ullmann's Encyclopedia of Industrial Chemistry], 5th ed., vol. A21, p. 169, Verlag Chemie, Weinheim, 1992. Further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, 3rd Ed. J. Wiley, New York 1989 and 4th Ed. J. Wiley, New York 2004.

Usually, the theoretical glass temperature $Tg^f$ calculated according to Fox as described herein and the experimentally determined glass transition temperature as described herein are similar or even same and do not deviate from each other by more than 5 K, in particular they deviate not more than 2 K. Accordingly, both the actual and the theoretical glass transition temperatures of the polymer phases (1) and (2) can be adjusted by choosing proper monomers Ma, Mb . . . Mn and their mass fractions $x_a$, $x_b$, . . . $x_n$ in the monomer composition so to arrive at the desired glass transition temperature Tg(1) and Tg(2), respectively. It is common knowledge for a skilled person to choose the proper amounts of monomers Ma, Mb . . . Mn for obtaining a copolymer and/or copolymer phase with the desired glass transition temperature.

The monomer composition forming the polymer phase (1) is preferably chosen such that the theoretical glass transition temperature $Tg^r(1)$ is preferably in the range of −25 to +60° C. and especially in the range of −10 to 50° C. Likewise, the monomer composition forming the polymer phase (1) is chosen such that the theoretical glass transition temperature $Tg^r(2)$ is preferably in the range of +50 to +150° C., more preferably in the range of 60 to 120° C. and especially in the range from 50 to 120° C. In any case, the difference $Tg^r(2)-Tg^r(1)$ is at least 10° C., in particular at least 20° C., especially at least 40° C.

In particular, the relative amount of monomers forming the polymer phase (1) and the monomers forming the polymer phase (2) are chosen such that the monomers M comprise
- 50 to 95 wt.-%, preferably 60 to 90 wt.-%, based on the total amount of the monomers M, of monomers forming the polymer phase (1) having the lower glass transition temperature Tg(1) and
- 5 to 50 wt.-%, preferably 10 to 40 wt.-%, based on the total amount of the monomers M, of monomers forming the polymer phase (2) having the higher glass transition temperature Tg(2).

Consequently, the polymer particles contained in the polymer dispersion obtainable by the process according to the present invention comprise
- 50 to 95 wt.-%, preferably 60 to 90 wt.-%, based on the total weight of the polymer particles, of the polymer phase (1) having the lower glass transition temperature Tg(1) and
- 5 to 50 wt.-%, preferably 10 to 40 wt.-%, based on the total weight of the polymer particles, of the polymer phase (2) having the higher glass transition temperature Tg(2).

It is apparent to the skilled person, that the monomers M forming the polymer phase (1) and the monomers M forming the polymer phase (2) may be distinct with regard to the type of monomers and/or with regard to their relative amounts. Apparently, the monomers M forming the polymer phase (2) will contain a higher amount of monomers which result in a high glass transition temperature. In one group of embodiments, the relative amount of monomers M2 is higher in the monomers M forming the polymer phase (2) than in the monomers M forming the polymer phase (1). In another group of embodiments, the relative amount of monomers M2 is higher in the monomers M forming the polymer phase (1) than in the monomers M forming the polymer phase (2). However, the overall composition of the monomers M forming the polymer phase (1) and the monomers M forming the polymer phase (2) is in the ranges given above.

As pointed out above, the aqueous polymer latex of the invention is prepared by aqueous emulsion polymerization of the monomers M, in particular a free-radical emulsion polymerization. Such an aqueous emulsion polymerization is usually performed in the presence of suitable surfactants. These surfactants typically comprise emulsifiers and provide micelles in which the polymerization occurs, and which serve to stabilize the monomer droplets during aqueous emulsion polymerization and also growing polymer particles. The surfactants used in the emulsion polymerization are usually not separated from the polymer latex, but remain in the aqueous polymer latex obtainable by the emulsion polymerization of the monomers M. While it is principally possible to perform the aqueous emulsion polymerization in the presence of a surfactant, which is different from the emulsifiers (1) and (2) contained in the aqueous polymer latex, it is beneficial, if the emulsion polymerisation of the monomers M is performed in the presence of the emulsifier combination of the present invention as described herein.

For the purpose of the invention it has been found beneficial, if the surfactants used in the emulsion polymerization of the monomers M comprise at least 80% by weight, in particular at least 90% by weight, based on the total amount of surfactants used in the emulsion polymerization of the monomers M, of the emulsifier combination of the present invention. In particular, the surfactants used in the emulsion polymerization of the monomers M do not comprise more than 20% by weight, in particular not more than 10% by weight, especially not more than 5% by weight, based on the total amount of surfactants used in the emulsion polymerization of the monomers M, are different from the emulsifiers (1) and (2). In other words, the total amount of first emulsifier (1) and the second emulsifier is at least 80% by weight, in particular at least 90% by weight and especially at least 95% by weight, based on the total amount of surfactants used in the emulsion polymerization of the monomers M.

For the purposes of the invention it has been found beneficial, if the total amount of surfactants present in the emulsion polymerization of the monomers M is in the range from 0.1 to 5% by weight, in particular in the range from 0.2 to 4% by weight, especially 0.3 to 3% by weight, based on the total amount of the monomers M polymerized in the emulsion polymerization.

The emulsion polymerization of the monomers M is preferably performed by a so-called monomer feed process, which means that at least 90% by weight, in particular at least 95% by weight, especially at least 98% by weight, or the total amount of the monomers M to be polymerized are fed into the polymerization reaction under polymerization conditions.

Here and in the following, the term "polymerization conditions" is well understood to mean those temperatures under which the aqueous emulsion polymerization proceeds at sufficient polymerization rate. The temperature depends particularly on the polymerization initiator, its concentration in the reaction mixture and the reactivity of the monomers. Suitable polymerization conditions can be determined by routine. In case of a free-radical aqueous emulsion polymerization, the polymerization is initiated by a so called free-radical initiator, which is a compound that decomposes to form free radicals, which initiate the polymerization of the monomers. Advantageously, the type and amount of the free-radical initiator, polymerization temperature and polymerization pressure are selected such that a sufficient number of initiating radicals is always present to initiate or to maintain the polymerization reaction.

Preferably, at least a portion of the emulsifier, e.g. at least 30% by weight, in particular at least 50% by weight, e.g. 30 to 100% by weight or 50 to 90% by weight, based on the total amount of emulsifiers used in the aqueous emulsion polymerization of the monomers M, is also fed into the polymerization reaction together with the portion of the monomers M fed into the polymerization reaction. The portion of emulsifier, which is fed into the polymerization reaction together with the portion of the monomers, preferably comprises at least a portion, in particular at least 50%, especially at least 80% or the total amount of the second emulsifier (2) used in the emulsion polymerization of the monomers M. In particular, the monomers M, which are fed to the polymerization reaction, are fed in the form of an aqueous emulsion, which contains at least a portion of the second emulsifier. The amount of the emulsifier which is fed into the polymerization reaction is frequently in the range from 0.1 to 4% by weight, especially in the range from 0.2 to 3.5% by weight, based on the total amount of monomers M.

Preferably, a portion of the emulsifier used in the aqueous emulsion polymerization of the monomers M, e.g. from 5 to 70% by weight or from 10 to 50% by weight, based on the total amount of emulsifier used in the emulsion polymerization of the monomers M, is also contained in the polymerization vessel, before the feeding of the aqueous emulsion of the monomer composition M is started. In particular, a portion, e.g. at least 50%, especially at least 80% or the total amount of the first emulsifier (1) used in the emulsion polymerization of the monomers M is contained in the polymerization vessel, before the feeding of the aqueous emulsion of the monomer composition M is started.

Frequently, the aqueous emulsion polymerization comprises charging a portion of the emulsifier, e.g. from 5 to 70% by weight or from 10 to 50% by weight, based on the total amount of emulsifier used in the emulsion polymerization of the monomers M, together with water into the reaction vessel. Then, usually an initial portion of the monomers, e.g. from 0.1 to 10% by weight, in particular from 0.5 to 5% by weight of the monomers M, and a portion, e.g. from 0.1 to 10% by weight, in particular from 0.5 to 5% by weight, of the polymerization initiator is added to the polymerization vessel and a polymerization of said initial portion of the monomers M is initiated, before the remainder of the monomers M and the remainder of the polymerization initiator is fed into the polymerization vessel under polymerization conditions. Together with the initial portion of the monomers or instead of this initial portion, it is also possible to add a so-called seed latex to the polymerization vessel.

Principally, every aqueous polymer latex may serve as a seed latex. For the purpose of the invention, preference is given to seed latexes, where the Z-average particle size of the polymer particles in the seed latex, as determined by dynamic light scattering at 20° C. (see hereinabove) is in the range from 10 to 100 nm, in particular from 10 to 60 nm. Preferably, the polymer particles of the seed latex are made of ethylenically unsaturated monomers, which comprise at least 95% by weight, based on the total weight of the monomers forming the seed latex, of one or more monomers M1 as defined above. The polymer particles of the seed latex particular comprise at least 95% by weight, based on the total weight of the monomers forming the seed latex, of at least one monomer M1b, where the proportion of monomers M1b is at least 50% by weight of the monomers forming the seed latex. A specifically preferred seed latex is polystyrene latex. The amount of seed latex, if used, is preferably in the range of 0.01 to 10% by weight, in particular in the range of 0.2 to 5% by weight, based of the total weight of the monomers M and calculated as polymer solids of the seed latex.

The process for producing the polymer latex of the present invention may be a single stage polymerization or a multistage emulsion polymerization. In a single stage polymerization, the overall composition of the monomers M, which are fed to the polymerization reaction under polymerization conditions, remains the same or almost the same, while in a multistage emulsion polymerization the overall composition of the monomers M, which are fed to the polymerization reaction under polymerization conditions, is altered at least once, in particular such that the theoretical glass transition temperature of the resulting polymer formed in one stage differs from the theoretical glass transition temperature of the resulting polymer formed in another stage by at least 10° C., in particular by at least 20° C. or at least 40° C.

In particular, the process of the invention is performed as a 2-stage emulsion polymerization, i.e. the composition of the monomers, which are fed to the polymerization reaction under polymerization conditions, is amended once, or as a 3-stage emulsion polymerization, i.e. the composition of the monomers, which are fed to the polymerization reaction under polymerization conditions, is amended twice.

In particular, the aqueous emulsion polymerization is a multistage aqueous emulsion polymerization, which comprises
  i. a first stage of aqueous emulsion polymerizing a monomer composition $M^i$, which corresponds to a theoretical glass transition temperature $Tg^r(i)$ according to Fox in the range from −25 to +60° C., in particular in the range from −10 to +50° C. to obtain a first stage polymer latex, and a
  ii. a second stage of aqueous emulsion polymerizing a monomer composition $M^{ii}$, in the first stage polymer latex, where the monomer composition $M^{ii}$ corresponds to a theoretical glass transition temperature $Tg^r(ii)$ according to Fox in the range from 50 to 150° C., in particular in the range from 60 to 120° C., provided that the temperature difference $Tg^r(ii)-Tg^r(i)$ is at least 10° C., in particular at least 20° C., especially at least 40° C.;
or which alternatively comprises
  i. a first stage of aqueous emulsion polymerizing a monomer composition $M^i$, which corresponds to a theoretical glass transition temperature $Tg^r(i)$ according to Fox in the range from 50 to 150° C., in particular in the range from 60 to 120° C. to obtain a first stage polymer latex, and a
  ii. a second stage of aqueous emulsion polymerizing a monomer composition $M^{ii}$, in the first stage polymer latex, where the monomer composition $M^{ii}$ corresponds to a theoretical glass transition temperature $Tg^r(ii)$ according to Fox in the range from −25 to +60° C., in particular in the range from −10 to +50° C., provided that the temperature difference $Tg^r(i)-Tg^r(ii)$ is at least 10° C., in particular at least 20° C., especially at least 40° C.

In these multistage aqueous emulsion polymerization, the monomer composition corresponding to the theoretical glass transition temperature in the range from −25 to +60° C., in particular in the range from −10 to +50° C., preferably contributes 50 to 95 wt.-%, more preferably 60 to 90 wt.-% to the overall amount of monomers M, while the monomer composition corresponding to the theoretical glass transition temperature in the range from 50 to 150° C., in particular in the range from 60 to 120° C., preferably contributes 5 to 50 wt.-%, more preferably 10 to 40 wt.-%, to the overall amount of monomers M.

In a particular group of embodiments, the aqueous emulsion polymerization is a multistage aqueous emulsion polymerization, which comprises
  i. a first stage of aqueous emulsion polymerizing a monomer composition $M^i$, which corresponds to a theoretical glass transition temperature Tg$^r$(i) according to Fox in the range from 50 to 150° C., in particular in the range from 60 to 120° C. to obtain a first stage polymer latex, where the monomer composition M$^i$ comprises from 0.5 to 10% by weight, based on the overall weight of the monomer composition M$^i$, of at least one monomer M2, ii. a second stage of aqueous emulsion polymerizing a monomer composition M$^{ii}$, in the first stage polymer latex, where the monomer composition M$^{ii}$ corresponds to a theoretical glass transition temperature Tg$^r$(ii) according to Fox in the range from 25 to +60° C., in particular in the range from −10 to +50° C., provided that the temperature difference Tg$^r$(i)−Tg$^r$(ii) is at least 10° C., in particular at least 20° C., especially at least 40° C., where the monomer composition M$^{ii}$ comprises at most 0.5% by weight, based on the overall weight of the monomer composition M$^{ii}$, of one or more monomers M2, where the polymer latex obtained in step i. is neutralized to a pH of at least pH 5 prior to performing the second stage of aqueous emulsion polymerization of step ii.

In this particular group of embodiments, the monomer composition M$^i$ preferably contributes 5 to 50 wt.-%, more preferably 10 to 40 wt.-% to the overall amount of monomers M, while the monomer composition M$^{ii}$ preferably contribute 50 to 95 wt.-%, preferably 60 to 90 wt.-%, to the overall amount of monomers M.

In this particular group of embodiments, the monomer composition M$^i$ is preferably polymerized in the presence of a chain transfer agent as described below. The amount of chain transfer agent may be in the range from 0.05 to 8% by weight, in particular in the range from 0.1 to 4% by weight, based on the total amount of the monomer composition M$^i$.

The conditions required for the performance of the emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE 4003422 A and Dispersionen synthetischer Hochpolymerer [Dispersions of Synthetic High Polymers], F. Hölscher, Springer-Verlag, Berlin (1969)], EP 184091, EP 710680, WO 2012/130712 and WO 2016/04116.

The free-radically initiated aqueous emulsion polymerization is triggered by means of a free-radical polymerization initiator (free-radical initiator). These may, in principle, be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 to 5 pphm, preferably 0.1 to 3 pphm.

The amount of free-radical initiator required in the process of the invention for the emulsion polymerization can be initially charged in the polymerization vessel completely. However, it is preferred to charge none of or merely a portion of the free-radical initiator, for example not more than 30% by weight, especially not more than 20% by weight, based on the total amount of the free-radical initiator required in the aqueous polymerization medium and then, under polymerization conditions, during the free-radical emulsion polymerization of the monomers M to add the entire amount or any remaining residual amount, according to the consumption, batchwise in one or more portions or continuously with constant or varying flow rates.

The free-radical aqueous emulsion polymerization of the invention is usually conducted at temperatures in the range from 0 to +170° C. Temperatures employed are frequently in the range from +50 to +120° C., in particular in the range from +60 to +120° C. and especially in the range from +70 to +110° C.

The free-radical aqueous emulsion polymerization of the invention can be conducted at a pressure of less than, equal to or greater than 1 atm (atmospheric pressure), and so the polymerization temperature may exceed +100° C. and may be up to +170° C.

Polymerization of the monomers is normally performed at ambient pressure, but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established.

Advantageously, the free-radical aqueous emulsion polymerization of the invention is conducted at ambient pressure (about 1 atm) with exclusion of oxygen, for example under an inert gas atmosphere, for example under nitrogen or argon.

The polymerization of the monomers M can optionally be conducted in the presence of chain transfer agents. Chain transfer agents are understood to mean compounds that transfer free radicals, and which reduce the molecular weight of the growing chain and/or which control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2 pentanethiol, 3-pentanethiol, 2-methyl-2-butanethiol, 3-methyl-2-butanethiol, n hexanethiol, 2-hexanethiol, 3-hexanethiol, 2-methyl-2-pentanethiol, 3-methyl-2 pentanethiol, 4-methyl-2-pentanethiol, 2-methyl-3-pentanethiol, 3-methyl-3 pentanethiol, 2-ethylbutanethiol, 2-ethyl-2-butanethiol, n-heptanethiol and the isomeric compounds thereof, n-octanethiol and the isomeric compounds thereof, n nonanethiol and the isomeric compounds thereof, n-decanethiol and the isomeric compounds thereof, n-undecanethiol and the isomeric compounds thereof, n dodecanethiol and the isomeric compounds thereof, n-tridecanethiol and isomeric compounds thereof, substituted thiols, for example 2-hydroxyethanethiol, aromatic thiols such as benzenethiol, ortho-, meta- or para-methylbenzenethiol, alkyl esters of mercaptoacetic acid (thioglycolic acid), such as 2-ethylhexyl thioglycolate, alkyl esters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene.

Alternatively, it is possible to use mixtures of the aforementioned chain transfer agents that do not disrupt one another. The total amount of chain transfer agents optionally used in the process of the invention, based on the total amount of monomers M, will generally not exceed 2% by weight, in particular 1% by weight. However, it is possible, that during a certain period of the polymerization reaction the amount of chain transfer agent added to the polymerization reaction may exceed the value of 2% by weight and may be as high as 8% by weight, in particular at most 4% by weight, based on the total amount of monomers M added to the polymerization reaction during said period.

The free-radical emulsion polymerization of the invention is usually effected in an aqueous polymerization medium, which, as well as water, comprises at least one surface-active substance, so-called surfactants, for stabilizing the emulsion of the monomers and the polymer particles of the polymer latex. Suitable surfactants are mentioned hereinabove.

It is frequently advantageous when the aqueous polymer dispersion obtained on completion of polymerization of the monomers M is subjected to a post-treatment to reduce the residual monomer content. This post-treatment is effected either chemically, for example by completing the polymerization reaction using a more effective free-radical initiator system (known as post-polymerization), and/or physically, for example by stripping the aqueous polymer dispersion with steam or inert gas. Corresponding chemical and physical methods are familiar to those skilled in the art, for example from EP 771328 A, DE 19624299 A, DE 19621027 A, DE 19741184 A, DE 19741187 A, DE 19805122 A, DE 19828183 A, DE 19839199 A, DE 19840586 A and DE 19847115 A. The combination of chemical and physical post-treatment has the advantage that it removes not only the unconverted ethylenically unsaturated monomers, but also other disruptive volatile organic constituents (VOCs) from the aqueous polymer dispersion.

Furthermore, it might be suitable to formulate the polymer latex of the invention with a post-curing agent. Ideally, such a post-curing agent, also termed as post-crosslinking agent, will result in a crosslinking reaction during and/or after film formation by forming coordinative or covalent bonds with reactive sites on the surface of the polymer particles.

Crosslinking agents, which are suitable for providing post crosslinking, are for example compounds having at least two functional groups selected from oxazoline, amino, aldehyde, aminoxy, carbodiimide, aziridinyl, epoxy and hydrazide groups, derivatives or compounds bearing acetoacetyl groups. These crosslinkers react with reactive sites of the polymers of the polymer dispersion which bear complementary functional groups in the polymer, which are capable of forming a covalent bond with the crosslinker. Suitable systems are known to skilled persons.

As the polymers contained in the polymer dispersion of the invention bear carboxyl groups, post-crosslinking can be achieved by formulation of the polymer dispersion with one or more polycarbodiimides as described in U.S. Pat. Nos. 4,977,219, 5,047,588, 5,117,059, EP 0277361, EP 0507407, EP 0628582, U.S. Pat. No. 5,352,400, US 2011/0151128 and US 2011/0217471. It is assumed that crosslinking is based on the reaction of the carboxyl groups of the polymers with polycarbodiimides. The reaction typically results in covalent cross-links which are predominately based on N-acyl urea bounds (J. W. Taylor and D. R. Bassett, in E. J. Glass (Ed.), Technology for Waterborne Coatings, ACS Symposium Series 663, Am. Chem. Soc., Washington, DC, 1997, chapter 8, pages 137 to 163).

Likewise, as the polymer particles contained in the polymer dispersion of the present invention bear carboxyl groups stemming from monomers M2, a suitable post-curing agent may also be a water-soluble or water-dispersible polymer bearing oxazoline groups, e.g. the polymers as described in U.S. Pat. No. 5,300,602 and WO 2015/197662.

Post crosslinking can also be achieved by analogy to EP 1227116, which describes aqueous two-component coating compositions containing a binder polymer with carboxylic acid and hydroxyl functional groups and a polyfunctional crosslinker having functional groups selected from isocyanate, carbodiimide, aziridinyl and epoxy groups.

If the polymer in the polymer dispersion bears a keto group, e.g. by using a monomer M3c such as diacetone acrylamide (DAAM), post-crosslinking can be achieved by formulating the aqueous polymer dispersion with one or more dihydrazides, in particular aliphatic dicarboxylic acid such as adipic acid dihydrazide (ADDH) as described in U.S. Pat. No. 4,931,494, US 2006/247367 and US 2004/143058. These components react basically during and after film formation, although a certain extent of preliminary reaction can occur.

Other suitable agents of achieving post-curing include
 epoxysilanes to crosslink carboxy groups in the polymer;
 dialdehydes such as glyoxal to crosslink urea groups or
  acetoacetoxy groups, such as those derived from the
  monomers M3b and M3c, respectively, as defined
  herein, in particular ureido (meth)acrylate or acetoacetoxyethyl (meth)acrylate; and
 di- and/or polyamines to crosslink keto groups or epoxy
  groups such as those derived from the monomers M3c
  or M3e as defined herein.

Suitable systems are e.g. described in EP 0789724, U.S. Pat. Nos. 5,516,453 and 5,498,659.

The present invention also relates to waterborne coating compositions, which contain a polymer latex of the present invention as a binder. In particular, the present invention also relates to waterborne coating compositions, which contain a polymer latex of the present invention as a binder and at least one inorganic tannin blocking compound.

These inorganic tannin blocking compounds are usually based on polyvalent metal salts and include, for example, the oxides, carbonates, sulfates, acetates, phosphates and phosphosilicates of polyvalent metals, in particular of polyvalent metals selected from zinc, aluminium, zirconium, barium or strontium. These inorganic tannin blocking compounds are sometimes termed reactive pigments.

In particular, the inorganic tannin blocking compounds/ reactive pigments are selected from the group consisting of oxides, phosphates and phosphosilicates of polyvalent metals, which are selected from zinc, aluminium, zirconium, barium and strontium. The aforementioned inorganic tannin blocking compounds may optionally be in the form of mixed salts or mixed salts with ammonium or potassium. Examples of inorganic tannin blocking compounds include in particular zinc oxide, ammonium zinc carbonate, zirconium acetate, ammonium zirconium carbonate, potassium zirconium carbonate, ammonium zirconium zinc carbonate, aluminium zirconium phosphosilicate, barium phosphosilicate, strontium phosphosilicate, calcium zinc phosphosilicate, strontium zinc phosphosilcate, calcium strontium zinc phosphosilicate and mixtures thereof. In particular, the inorganic tannin blocking compounds are selected from inorganic compounds, which comprise zinc and inorganic compounds, which comprise zinc, with inorganic compounds comprising zirconium and/or aluminium. In particular, the inorganic tannin blocking compound comprises zinc oxide. Suitable inorganic tannin blocking compounds/reactive pigments are commercially available, in particular in the form of liquid formulations, including but not limited to Halox® grades of Halox, USA, such as Halox® BW-100 (bariumphosphosilicate), Halox® Xtain® L-44 (liquid formulation of an ammonium zirconium carbonate), Stainban® grades of WPC technologies, such Stainban® 180 (aqueous formulation zirconium acetate), Stainban® 185 (aqueous formulation of ammonia stabilized mixture of zirconium carbonate and zinc carbonate), Stainban® 187 (aqueous formulation of ammonia stabilized zirconium carbonate) and Stainban® 208 (calcium strontium zinc phosphosilicate powder), Bacote® grades of MEL Chemicals, such as Bacote® 20 (liquid formulation of an ammonia stabilized zirconium carbonate), and Zinkweiss grades of Grillo such as Zinkweiss RS (zinc oxide powder).

The concentration of the inorganic tannin blocking compound/reactive pigment in the waterborne coating compositions of the invention is usually in the range from 0.1 to 10% by weight, in particular in the range from 0.2 to 5% by weight, based on the total weight of the waterborne coating composition.

The waterborne coating compositions of the invention may be formulated as a clear coat or a as a paint. In the latter case, the waterborne coating compositions contain, in addition to the polymer latex and the reactive pigment, at least one inorganic pigment, which imparts a white shade or a color to the coating obtained when using the waterborne coating composition for coating substrates.

Pigments for the purposes of the present invention are virtually insoluble, finely dispersed, organic or preferably inorganic colorants as per the definition in German standard specification DIN 55944:2003-11. Examples of pigments are in particular inorganic pigments, such as white pigments like titanium dioxide (C.I. Pigment White 6), but also color pigments, e.g.

black pigments, such as iron oxide black (C.I. Pigment Black 11), iron manganese black, spinel black (C.I. Pigment Black 27), carbon black (C.I. Pigment Black 7);

color pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 und 36); ultramarine blue, iron blue (C.I. Pigment Blue 27), manganese blue, ultramarine violet, cobalt violet, manganese violet, iron oxide read (C.I. Pigment Red 101); cadmium sulfoselenide (C.I. Pigment Red 108); molybdate read (C.I. Pigment Red 104); ultramarine read, iron oxide brown, mixed brown, spinel- and Korundum phases (C.I. Pigment Brown 24, 29 und 31), chrome orange;

iron oxide yellow (C.I. Pigment Yellow 42); nickel titanium yellow (C.I. Pigment Yellow 53; C.I. Pigment Yellow 157 und 164); chrome titanium yellow; cadmium sulfide und cadmium zinc sulfide (C.I. Pigment Yellow 37 und 35); Chrome yellow (C.I. Pigment Yellow 34), zinc yellow, alkaline earth metal chromates; Naples yellow; bismuth vanadate (C.I. Pigment Yellow 184);

Interference pigments, such as metallic effect pigments based on coated metal platelets, pearl luster pigments based on mica platelets coated with metal oxide, and liquid crystal pigments.

The water-borne coating compositions may also contain one or more fillers. Examples of suitable fillers are aluminosilicates, such as feldspars, silicates, such as kaolin, talc, mica, magnesite, alkaline earth metal carbonates, such as calcium carbonate, for example in the form of calcite or chalk, magnesium carbonate, dolomite, alkaline earth metal sulfates, such as calcium sulfate, silicon dioxide, etc. In the coating compositions of the invention, finely divided fillers are naturally preferred. The fillers may be used in the form of individual components. In practice, however, filler mixtures have been found to be particularly useful, for example calcium carbonate/kaolin, calcium carbonate/talc. Gloss paints generally comprise only small amounts of very finely divided fillers or do not comprise any fillers. Fillers also include flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

The proportion of the pigments and fillers in the water-borne coating compositions can be described in a manner known per se via the pigment volume concentration (PVC). The PVC describes the ratio of the volume of pigments (VP) and fillers (VF) relative to the total volume, consisting of the volumes of binder (VB), pigments (VP) and fillers (VF) in a dried coating film in percent: PVC=(VP+VF)×100/(VP+VF+VB).

The water-borne coating compositions usually have a pigment volume concentration (PVC) of at least 5, especially at least 10. Preferably, the PVC will not exceed a value of 60, especially 40, and is specifically in the range from 5 to 60 or 5 to 40. However, the inventive effects of the polymer dispersions are also manifested in varnishes which typically have a pigment/filler content below 5% by weight, based on the varnish, and correspondingly have a PVC below 5.

The water-borne coating compositions of the invention are preferably designed as a paint containing white pigment—that is, they comprise at least one white pigment and optionally one or more fillers. As white pigment they include, in particular, titanium dioxide, preferably in the rutile form, optionally in combination with one or more fillers. With particular preference, the coating compositions of the invention comprise a white pigment, more particularly titanium dioxide, preferably in the rutile form, in combination with one or more fillers, such as chalk, talc or mixtures thereof, for example.

In a preferred embodiment, the waterborne coating compositions comprise at least one aqueous polymer latex as defined herein, further comprises a rheology modifying agent. Suitable rheology modifying agents include associative thickener polymers and non-associative rheology modifiers. The aqueous liquid composition preferably comprises a thickening agent selected from the group consisting of associative thickeners and optionally a non-associative thickener.

Associative thickener polymers are well known and frequently described in the scientific literature, e.g. by E. J. Schaller et al., "Associative Thickeners" in Handbook of Coating Additives, Vol. 2 (Editor L. J. Calbo), Marcel Decker 192, pp. 105-164, J. Bieleman "PUR-Verdicker" in Additives for Coatings (Editor J. Bielemann), Wiley 2000, pp 50-58. NiSAT thickener polymers of the HEUR and HMPE type are also described in the patent literature, such as U.S. Pat. Nos. 4,079,028, 4,155,892, EP 61822, EP 307775, WO 96/31550, EP 612329, EP 1013264, EP 1541643, EP 1584331, EP 2184304, DE 4137247, DE 102004008015, DE 102004031786, US 2011/0166291 and WO 2012/052508. Apart from that, associative thickener polymers are commercially available.

The associative thickener polymers include anionic, acrylate type thickener polymers, so-called HASE polymers (hydrophobically modified polyacrylate thickeners), which are copolymers of acrylic acid and alkyl acrylate monomers, where the alkyl group of the alkyl acrylate may have from 6 to 24 carbon atoms. The associative thickener polymers also include non-ionic associative thickeners, so called NiSAT thickeners (non-ionic synthetic associative thickeners), which usually are linear or branched block copolymers having at least one interior hydrophilic moiety, in particular a polyether moiety, especially at least one polyethylene oxide moiety and two or more terminal hydrocarbon groups each having at least 4 carbon atoms, in particular from 4 to 24 carbon atoms, e.g. a linear or branched alkyl radical having 4 to 24 carbon atoms or alkyl substituted phenyl having 7 to 24 carbon atoms. NiSAT thickeners include the hydrophobically modified polyethylene oxide urethane rheology modifiers, also termed HEUR or PUR thickeners, and hydrophobically modified polyethyleneoxides, which are also termed HMPE.

The amount of the associative thickener polymer will depend on the desired viscosity profile and is frequently in the range from 0.05 to 2.5% by weight, in particular 0.1 to 2% by weight of thickener, and especially 0.2 to 2% by weight, based on the latex paint.

Suitable non-associative rheology modifiers are in particular cellulose based thickeners, especially hydroxyethyl cellulose, but also thickeners based on acrylate emulsions (ASE). Amongst the non-associative rheology modifiers preference is given to non-associative cellulose based thickeners.

The total amount of the thickener polymer will depend on the desired viscosity profile and is frequently in the range from 0.05 to 2.5% by weight, in particular 0.1 to 2% by weight of thickener, and especially 0.15 to 1.5% by weight, based on the latex paint.

The aqueous coating compositions of the invention may also comprise customary auxiliaries. The customary auxiliaries will depend from the kind of the coating in a well-known manner and include but are not limited to:
  wetting agents or dispersants,
  filming auxiliaries, also termed coalescents,
  leveling agents,
  biocides and
  defoamers.

Suitable wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Suitable filming auxiliaries are solvents and plasticizers. Plasticizers, in contrast to solvents, have a low volatility and preferably have a boiling point at 1013 mbar of higher than 250° C., while solvents have a higher volatility than plasticizers and preferably have a boiling point at 1013 mbar of less than 250° C. Suitable filming auxiliaries are, for example, white spirit, pine oil, propylene glycol, ethylene glycol, butyl glycol, butyl glycol acetate, butyl glycol diacetate, butyl diglycol, butylcarbitol, 1-methoxy-2-propanol, 2,2,2-trimethyl-1,3-pentanediol monoisobutyrate (Texanol®) and the glycol ethers and esters, commercially available, for example, from BASF SE under the Solvenon® and Lusolvan® and Loxanol® names, and from Dow under the Dowanol® trade name. The amount is preferably <5% by weight and more preferably <1% by weight, based on the overall formulation. Formulation is also possible completely without filming auxiliaries. If the coating compositions contain filming auxiliaries, these are preferably selected from plasticizers. Frequently, the coating compositions do not require any filming auxiliaries.

Further suitable auxiliaries and components are e.g. described by J. Bieleman in "Additives for Coatings", Whiley-VCH, Weinheim 2000; by T. C. Patton in "Paint Flow and Pigment Dispersions", 2. Edition, John Whiley & Sons 1978; and by M. Schwartz and R. Baumstark in "Water based Acrylates for Decorative Coatings", Curt R. Vincentz Verlag, Hanover 2001.

The waterborne coating compositions of the invention preferably do not contain any volatile organic compound. In case that volatile organic compounds are present, the concentration of said compounds is usually below 0.2 wt.-%, preferably below 0.1 wt.-%, more preferably below 0.05 wt.-%, based on the total amount of the waterborne coating composition. A volatile compound in terms of the invention is a compound, which has a boiling point at 1013 mbar of less than 250° C.

The waterborne coating compositions are particularly useful for coating a tannin containing substrate such as wood or wood-based materials.

The waterborne coating compositions can be applied to substrates to be coated in a customary manner, for example by applying it with brushes or rollers, by spraying, by dipping, by rolling, or by bar coating to the desired substrate. Preferred applications are by brush and/or by roller.

Usually, the coating of substrates is effected in such a way that the substrate is first coated a waterborne coating composition of the invention, and then the thus obtained aqueous coating is subjected to a drying step, especially within the temperature range of ≥−10 and ≤+50° C., advantageously ≥+5 and ≤+40° C. and especially advantageously ≥+10 and ≤+35° C.

The tannin-containing substrates coated with a waterborne coating composition of the invention have excellent resistance toward color runs and color strikethrough not only during application and drying ("early tannin blocking effect"), but also after drying, on exposure to water or to weathering conditions ("late tannin blocking effect"). Moreover, they are stable against aging and do not suffer from an undesirable increase of viscosity upon storage. Moreover, the coatings obtained according by using a coating composition of the invention are less prone to form cracks which are often observed when coating tannin containing substrates with waterborne coating compositions containing inorganic tannin blocking agents.

The invention is to be illustrated by non-limiting examples which follow.

1. Analytics of the Polymer Latexes 1.1 Solids Content

The solids content was determined by drying a defined amount of the aqueous polymer dispersion (about 2 g) to constant weight in an aluminum crucible having an internal diameter of about 5 cm at 130° C. in a drying cabinet (2 hours). Two separate measurements were conducted. The value reported in the example is the mean of the two measurements.

1.2 Particle Diameter

If not stated otherwise, average particle diameter of the polymer latex was determined by QELS as described above, using a Malvern HPPS.

The weight-average particle diameter of the polymer latex may also be determined by HDC. Measurements were carried out using a PL-PSDA particle size distribution analyzer (Polymer Laboratories, Inc.). A small amount of sample of the polymer latex was injected into an aqueous eluent containing an emulsifier, resulting in a concentration of approximately 0.5 g/l. The mixture was pumped through a glass capillary tube of approximately 15 mm diameter packed with polystyrene spheres. As determined by their hydrodynamic diameter, smaller particles can sterically access regions of slower flow in capillaries, such that on average the smaller particles experience slower elution flow. The fractionation was finally monitored using an UV-detector which measured the extinction at a fixed wavelength of 254 nm.

2. Emulsifiers

Emulsifier 1: 30% b.w. aqueous solution of the sodium salt of the sulfuric-acid hemiester of an ethoxylated C16/C18 fatty alcohol with a degree of ethoxylation of 12 (Disponil® FES 993)

Emulsifier 2: 33% b.w. aqueous solution of the sodium salt of the sulfuric-acid hemiester of an ethoxylated C16/C18 fatty alcohol with a degree of ethoxylation of 30 (Disponil® FES 77)

Emulsifier 3: 15% b.w. aqueous solution of sodium lauryl sulfate

Emulsifier 4: 31% b.w. aqueous solution of the sodium salt of the sulfuric-acid hemiester of an ethoxylated C16/C18 fatty alcohol with a degree of ethoxylation of 4 (Disponil® FES 32)

Emulsifier 5: 20% b.w. aqueous solution of the sodium salt of linear dodecylbenezene sulfonate (Disponil® LDBS 20)

Emulsifier 6: 20% b.w. aqueous solution of the ammonium salt of the phosphoric-acid hemiester of an ethoxylated/propoxylated C13/15 oxoalkohol (Lutensit® AEP-A 20)

Emulsifier 7: 45% b.w. aqueous solution of the sodium salt of a C12-Alkyldiphenyloxide disulfonate (Dowfax® 2A1)

Emulsifier 8: ammonium salt of the sulfuric-acid hemiester of an ethoxylated tristyrylphenol with a degree of ethoxylation of 16 (Lucramul® SPS 16)

Emulsifier 9: ammonium salt of the sulfuric-acid hemiester of an ethoxylated tristyrylphenol with a degree of ethoxylation of 16 (Soprophor® 4D384)

Emulsifier 10: ammonium salt of the sulfuric-acid hemiester of an ethoxylated tristyrylphenol with a degree of ethoxylation of 29 (Lucramul® SPS 29)

3. Ingredients of the Coating Composition

Dispersant: 25% by weight aqueous solution of the sodium salt of a polyacrylic acid with average molecular mass of 12000 g/mol (Dispex® CX4320 of BASF SE)

Defoamer: Silicon based defoamer (Foamstar® SI2210 of BASF SE)

Thickener: 20 wt.-% aqueous solution of an HEUR associative thickener (Rheovis® PU1340 of BASF SE)

$TiO_2$ pigment: Rutile type pigment with average particle size of 0.2 μm (Tronox® CR-826 of Tronox Ltd.)

Filler 1: Mg-Silicate with d50 of 4.5 μm (Finntalc M15 of Mondo Minerals B. V.)

Filler 2: Calcium Carbonate with d50 of 6.0 μm (Omyacarb 5GU of Omya GmbH)

Reactive Pigment: Zinc oxide (zinc white RS of Grillo Werke AG)

Film Former: 2,2,4-Trimethyl-1,3-pentandiolmonoisobutyrat (Texanol®)

4. Preparation of Polymer Latexes 4.1 Example 1

In a polymerization vessel equipped with metering devices and a temperature control, at 22° C., 357.5 g Deionized water and 64.2 g Emulsifier 1 were added in a nitrogen atmosphere and heated to 87° C. whilst being stirred. At 80° C., 43.4 g of feed 2 and 3.2 g of a 7% b.w. aqueous solution of sodium peroxodisulfate were added and further heated to 87° C. 5 minutes later, feed 1 and 2 (remaining quantity) were started and metered into the reaction vessel within 120 minutes. After the end of feed 1 and 2, postpolymerization was effected for 5 minutes. Then, feed 3 and 4 were metered into the reaction vessel in 45 minutes.

| Feed 1: | |
| --- | --- |
| 13.7 g | 7% b.w. aqueous solution of sodium peroxodisulfate |
| Feed 2 (emulsion comprising): | |
| 537.9 g | Deionized water |
| 47.1 g | Emulsifier 2 |
| 8.0 g | Acrylic acid |
| 9.0 g | 50% b.w. aqueous solution of acrylamide |
| 313.0 g | Methyl methacrylate |

-continued

| 448.7 g | 2-Ethylhexyl acrylate |
| 42.5 g | 25% b.w. solution of ureido methacrylate in methyl methacrylate |

Feed 3:

| 5.1 g | 7% b.w. aqueous solution of sodium peroxodisulfate |

Feed 4 (emulsion comprising):

| 277.0 g | Deionized water |
| 17.9 g | Emulsifier 2 |
| 8.0 g | Acrylic acid |
| 42.5 g | 25% b.w. solution of ureido methacrylate in methyl methacrylate |
| 232.9 g | Methyl methacrylate |

After completion of feed 3 and 4, the polymerization mixture was allowed to react at 87° C. for 30 minutes; then 5.3 g of a 25% b.w. aqueous solution of ammonia and 55.4 g of deionized water were added. While being stirred for 60 minutes, the mixture was cooled down to 82° C. In parallel, 22.9 g of a 7.7% b.w. aqueous solution of hydrogen peroxide and 22.8 g of a 6.8% b.w. aqueous solution of L-ascorbic acid were metered into the reaction vessel. After that, 15.4 g of a 7.1% b.w. aqueous ammonia solution were added; the mixture was cooled down to 22° C., and the aqueous polymer dispersion was filtered off via a 125 µm filter.

The obtained polymer latex had a solids content of 44.8%, a pH-value of 7.7, and an average particle size of 76 nm according to HDC.

4.2 Example 2

In a polymerization vessel equipped with metering devices and a temperature control, at 22° C.,

| 390.0 g | Deionized water and |
| 70.0 g | Emulsifier 1 | were added in a nitrogen atmosphere and heated to 80° C. whilst being stirred. At 80° C., 30.0 g methyl methacrylate and 3.5 g of a 7% b.w. aqueous solution of sodium peroxodisulfate were added. 5 minutes later, feed 1 and 2 were started and metered into the reaction vessel within 109 minutes; the polymerization temperature was set to 87° C. After the end of feed 1 and 2, postpolymerization was effected for 5 minutes. Then feed 3 and 4 were metered into the reaction vessel in 52 minutes.

Feed 1:

| 14.1 g | 7% b.w. aqueous solution of sodium peroxodisulfate |

Feed 2 (emulsion comprising):

| 586.8 g | Deionized water |
| 46.5 g | Emulsifier 2 |
| 11.2 g | Acrylic acid |
| 9.1 g | 50% b.w. aqueous solution of acrylamide |
| 307.0 g | Methyl methacrylate |
| 445.1 g | 2-Ethylhexyl acrylate |
| 42.2 g | 25% b.w. solution of ureido methacrylate in methyl methacrylate |

Feed 3:

| 6.5 g | 7% b.w. aqueous solution of sodium peroxodisulfate |

Feed 4 (emulsion comprising):

| 302.2 g | Deionized water |
| 22.9 g | Emulsifier 2 |
| 20.2 g | Acrylic acid |
| 54.0 g | 25% b.w. solution of ureido methacrylate in methyl methacrylate |
| 285.8 g | Methyl methacrylate |

After completion of feed 3 and 4, the polymerization mixture was allowed to react at 87° C. for 30 minutes; then 4.8 g of a 25% b.w. aqueous solution of ammonia and 60.5 g of deionized water were added; the mixture was stirred for another 60 minutes. In the meantime, 17.0 g of an 11.3% b.w. aqueous solution of hydrogen peroxide and 16.7 g of a 10.1% b.w. aqueous solution of L-Ascorbic acid were metered into the reaction vessel. After that, 12 g of a 25% b.w. aqueous solution of ammonia and 26.6 g of deionized water were added; the mixture was cooled down to 22° C. and the aqueous polymer dispersion obtained was filtered off via a 125 µm filter.

The dispersion had a solids content of 44.8%, a pH-value of 7.7, and an average particle size of 78 nm according to HDC.

4.3 Example 3

In a polymerization vessel equipped with metering devices and a temperature control, at 22° C.,

| 380.4 g | Deionized water and |
| 40.0 g | Emulsifier 1 | were added in a nitrogen atmosphere and heated to 80° C. At 80° C., 30.0 g of methyl methacrylate and 3.5 g of a 7% b.w. aqueous solution of sodium peroxodisulfate were added. After 5 minutes, feed 1 and 2 were started and metered into the reaction vessel within 135 minutes; within the first 20 minutes, the polymerization temperature was increased to 87° C. After the end of feed 1 and 2, postpolymerization was effected for 5 minutes. Then feed 3 and 4 were metered into the reaction vessel in 45 minutes.

Feed 1:

| 15.8 g | 7% b.w. aqueous solution of sodium peroxodisulfate |

Feed 2 (emulsion comprising):

| 632.4 g | Deionized water |
| 48.8 g | Emulsifier 2 |
| 4.2 g | Acrylic acid |
| 13.9 g | 50% b.w. aqueous solution of acrylamide |
| 302.6 g | Methyl methacrylate |
| 569.6 g | 2-Ethylhexyl acrylate |
| 46.6 g | 25% b.w. solution of ureido methacrylate in methyl methacrylate |

Feed 3:

| 4.8 g | 7% b.w. aqueous solution of sodium peroxodisulfate |

Feed 4 (emulsion comprising):

| 157.2 g | Deionized water |
| 22.5 g | Emulsifier 2 |
| 13.8 g | Methacrylic acid |
| 226.2 g | Methyl methacrylate |

After completion of feed 3 and 4, the polymerization mixture was allowed to react for 15 minutes at 87° C.; then 20.5 g of a 1.2% b.w. aqueous solution of sodium peroxodisulfate were added within 15 minutes. Subsequently, 3.4 g of a 25% b.w. aqueous solution of ammonia were added within 10 minutes and stirred in; 21.8 g of deionized water were added and stirred for another 60 minutes at 82° C. Then, 4.3 g of a 25% b.w. aqueous ammonia solution and 6 g of deionized water were added. The mixture was cooled down to 22° C. and the aqueous polymer dispersion obtained was filtered via a 125 μm filter.

The obtained polymer latex had a solids content of 48.2%, a pH-value of 8.3 and an average particle size of 103 nm according to HDC.

4.4 Comparative Example C1

In a polymerization vessel equipped with metering devices and a temperature control, at 22° C.,

| 341.9 g | Deionized water and |
| 55.0 g | Emulsifier 3 | were added in a nitrogen atmosphere and heated to 87° C. whilst being stirred. At 80° C., 43.0 g of feed 2 and 3.2 g of a 7% b.w. aqueous solution of sodium peroxodisulfate were added, and the mixture was further heated to 87° C. 5 minutes later, feed 1 and 2 (remaining quantity) were started and metered into the reaction vessel within 120 minutes. After the end of feed 1 and 2, postpolymerization was effected for 5 minutes.

Then, feed 3 and 4 were metered into the reaction vessel in 45 minutes.

| Feed 1: | |
|---|---|
| 13.7 g | 7% b.w. aqueous solution of sodium peroxodisulfate |
| | Feed 2 (emulsion comprising): |
| 526.1 g | Deionized water |
| 36.7 g | Emulsifier 3 |
| 8.0 g | Acrylic acid |
| 9.0 g | 50% b.w. aqueous solution of acrylamide |
| 313.0 g | Methyl methacrylate |
| 448.7 g | 2-Ethylhexyl acrylate |
| 42.5 g | 25% b.w. solution of ureido methacrylate in methyl methacrylate |
| | Feed 3: |
| 5.1 g | 7% b.w. aqueous solution of sodium peroxodisulfate |
| | Feed 4 (emulsion comprising): |
| 272.9 g | Deionized water |
| 13.9 g | Emulsifier 3 |
| 8.0 g | Acrylic acid |
| 42.5 g | 25% b.w. solution of ureido methacrylate in methyl methacrylate |
| 232.9 g | Methyl methacrylate |

After completion of feed 3 and 4, the polymerization mixture was allowed to react for 30 minutes at 87° C.; then 5.3 g of a 25% b.w. aqueous solution of ammonia and 55.4 g of deionized water were added. The mixture was cooled down to 82° C. and stirred for 60 minutes. At the same time, 22.9 g of a 7.7% b.w. aqueous solution of hydrogen peroxide and 22.8 g of a 6.8% b.w. solution of L-Ascorbic acid were metered into the reaction vessel. After that, 15.4 g of a 7.1% b.w. aqueous ammonia solution were added; the mixture was cooled down to 22° C. and the aqueous polymer dispersion was filtered via a 125 μm filter.

The obtained polymer latex had a solids content of 44.2%, a pH-value of 7.7 and an average particle size of 68 nm according to HDC.

4.5 COMPARATIVE EXAMPLE C2

In a polymerization vessel equipped with metering devices and a temperature control, at 22° C.,

| 341.9 g | Deionized water and |
| 55.0 g | Emulsifier 3 | were added in a nitrogen atmosphere and heated to 87° C. whilst being stirred. At 80° C., 43.7 g of feed 2 and 3.2 g of a 7% b.w. aqueous solution of sodium peroxodisulfate were added, and the mixture was further heated to 87° C. 5 minutes later, feed 1 and 2 (remaining quantity) were started and metered into the reaction vessel within 120 minutes. After the end of feed 1 and 2, postpolymerization was effected for 5 minutes. Then, feed 3 and 4 were metered into the reaction vessel in 45 minutes.

| Feed 1: | |
|---|---|
| 13.7 g | 7% b.w. aqueous solution of sodium peroxodisulfate |
| | Feed 2 (emulsion comprising): |
| 537.9 g | Deionized water |
| 47.1 g | Emulsifier 2 |
| 8.0 g | Acrylic acid |
| 9.0 g | 50% b.w. aqueous solution of acrylamide |
| 313.0 g | Methyl methacrylate |
| 448.7 g | 2-Ethylhexyl acrylate |
| 42.5 g | 25% b.w. solution of ureido methacrylate in methyl methacrylate |
| | Feed 3: |
| 5.1 g | 7% b.w. aqueous solution of sodium peroxodisulfate |
| | Feed 4 (emulsion comprising): |
| 277.0 g | Deionized water |
| 17.9 g | Emulsifier 2 |
| 8.0 g | Acrylic acid |
| 42.5 g | 25% b.w. solution of ureido methacrylate in methyl methacrylate |
| 232.9 g | Methyl methacrylate |

After completion of feed 3 and 4, the polymerization mixture was allowed to react for 30 minutes at 87° C.; then 5.3 g of a 25% b.w. aqueous solution of ammonia and 55.4 g of deionized water were added. The mixture was cooled down to 82° C. and stirred for 60 minutes. At the same time, 22.9 g of a 7.7% b.w. aqueous solution of hydrogen peroxide and 22.8 g of a 6.8% b.w. solution of L-Ascorbic acid were metered into the reaction vessel. After that, 11 g of deionized water and 4.4 g of a 25% b.w. aqueous ammonia solution were added; the mixture was cooled down to 22° C., and the aqueous polymer dispersion was filtered via a 125 μm filter.

The obtained polymer latex had a solids content of 44.6%, a pH-value of 7.4 and an average particle size of 64 nm according to HDC.

4.6 Comparative Example C3

In a polymerization vessel equipped with metering devices and a temperature control, at 22° C.,

| 358.6 g | Deionized water and |
| 55.0 g | Emulsifier 1 | were added in a nitrogen atmosphere and heated to 87° C. whilst being stirred. At 80° C., 43.2 g of feed 2 and 3.2 g of a 7% b.w. aqueous solution of sodium peroxodisulfate were added, and the mixture was further heated to 87° C. 5 minutes later, feed 1 and 2 (remaining quantity) were started and metered into the reaction vessel within 120 minutes. After the end of feed 1 and 2, postpolymerization was effected for 5 minutes. Then, feed 3 and 4 were metered into the reaction vessel in 45 minutes.

| Feed 1: | |
| --- | --- |
| 13.7 g | 7% b.w. aqueous solution of sodium peroxodisulfate |
| Feed 2 (emulsion comprising): | |
| 543.4 g | Deionized water |
| 24.9 g | Emulsifier 1 |
| 8.0 g | Acrylic acid |
| 9.0 g | 50% b.w. aqueous solution of acrylamide |
| 313.0 g | Methyl methacrylate |
| 448.7 g | 2-Ethylhexyl acrylate |
| 42.2 g | 25% b.w. solution of ureido methacrylate in methyl methacrylate |
| Feed 3: | |
| 5.1 g | 7% b.w. aqueous solution of sodium peroxodisulfate |
| Feed 4 (emulsion comprising): | |
| 281.4 g | Deionized water |
| 9.5 g | Emulsifier 1 |
| 8.0 g | Acrylic acid |
| 42.5 g | 25% b.w. solution of ureido methacrylate in methyl methacrylate |
| 232.9 g | Methyl methacrylate |

After completion of feed 3 and 4, the polymerization mixture was allowed to react for 30 minutes at 87° C.; then 5.3 g of a 25% b.w. aqueous solution of ammonia and 55.4 g of deionized water were added. The mixture was cooled down to 82° C. and stirred for 60 minutes. At the same time, 22.8 g of a 7.7% b.w. aqueous solution of hydrogen peroxide and 22.8 g of a 6.8% b.w. aqueous solution of L-Ascorbic acid were metered into the reaction vessel. After that, 15.4 g of a 7.1% b.w. aqueous ammonia solution were added; the mixture was cooled down to 22° C., and the aqueous polymer dispersion was filtered via a 125 µm filter.

The obtained polymer latex had a solids content of 44.7%, a pH-value of 7.4 and an average particle size of 90 nm according to HDC.

4.7. Comparative Example C4

In a polymerization vessel equipped with metering devices and a temperature control, at 22° C.,

| 391.2 g | Deionized water and |
| --- | --- |
| 67.7 g | Emulsifier 4 | were added in a nitrogen atmosphere and heated to 80° C. whilst being stirred. At 80° C., 30.0 g of methyl methacrylate and 3.5 g of a 7% b.w. aqueous solution of sodium peroxodisulfate were added. 5 minutes later, feed 1 and 2 (remaining quantity) were started and metered into the reaction vessel within 109 minutes, and the polymerization temperature was set to 87° C. After the end of feed 1 and 2, postpolymerization was effected for 5 minutes. Then, feed 3 and 4 were metered into the reaction vessel 52 minutes.

| Feed 1: | |
| --- | --- |
| 14.1 g | 7% b.w. aqueous solution of sodium peroxodisulfate |
| Feed 2 (emulsion comprising): | |
| 586.8 g | Deionized water |
| 46.5 g | Emulsifier 2 |
| 11.2 g | Acrylic acid |
| 9.1 g | 50% b.w. aqueous solution of acrylamide |
| 307.0 g | Methyl methacrylate |
| 445.1 g | 2-Ethylhexyl acrylate |
| 42.2 g | 25% b.w. solution of ureido methacrylate in methyl methacrylate |
| Feed 3: | |
| 6.5 g | 7% b.w. aqueous solution of sodium peroxodisulfate |
| Feed 4 (emulsion comprising): | |
| 302.2 g | Deionized water |
| 22.9 g | Emulsifier 2 |
| 20.2 g | Acrylic acid |
| 54.0 g | 25% b.w. solution of ureido methacrylate in methyl methacrylate |
| 285.8 g | Methyl methacrylate |

After completion of feed 3 and 4, the polymerization mixture was allowed to react for 30 minutes at 87° C.; then 4.8 g of a 25% b.w. aqueous solution of ammonia and 60.5 g of deionized water were added and stirred for another 60 minutes. At the same time, 17.0 g of an 11.3% b.w. aqueous solution of hydrogen peroxide and 16.7 g of a 10.1% b.w. aqueous solution of L-Ascorbic acid were metered into the reaction vessel. After that, 12 g of a 25% b.w. aqueous ammonia solution and 26.6 g of deionized water were added; the mixture was cooled down to 22° C., and the aqueous polymer dispersion was filtered via a 125 µm filter.

The obtained polymer latex had a solids content of 44.3%, a pH-value of 7.5 and an average particle size of 69 nm according to HDC.

4.8. Comparative Example C5

In a polymerization vessel equipped with metering devices and a temperature control, at 22° C.,

| 394.0 g | Deionized water and |
| --- | --- |
| 9.0 g | Emulsifier 5 | were added in a nitrogen atmosphere and heated to 80° C. whilst being stirred. At 80° C., 30.0 g of methyl methacrylate and 3.5 g of a 7% b.w. aqueous solution of sodium peroxodisulfate were added. 5 minutes later, feed 1 and 2 were started and metered into the reaction vessel within 135 minutes, and the polymerization temperature was increased to 87° C. within the first 20 minutes. After the end of feed 1 and 2, postpolymerization was effected for 5 minutes. Then, feed 3 and 4 were metered into the reaction vessel in 45 minutes.

| Feed 1: | |
| --- | --- |
| 15.8 g | 7% b.w. aqueous solution of sodium peroxodisulfate |
| Feed 2 (emulsion comprising): | |
| 581.2 g | Deionized water |
| 1.6 g | Emulsifier 7 |
| 115.2 g | Emulsifier 6 |
| 4.2 g | Methacrylic acid |
| 13.9 g | 50% b.w. aqueous solution of acrylamide |

| | |
|---|---|
| 302.6 g | Methyl methacrylate |
| 569.6 g | 2-Ethylhexyl acrylate |
| 46.6 g | 25% b.w. solution of ureido methacrylate in methyl methacrylate |

Feed 3:

| | |
|---|---|
| 4.8 g | 7% b.w. aqueous solution of sodium peroxodisulfate |

Feed 4 (emulsion comprising):

| | |
|---|---|
| 149.5 g | Deionized water |
| 0.4 g | Emulsifier 7 |
| 25.8 g | Emulsifier 6 |
| 13.8 g | Methacrylic acid |
| 226.2 g | Methyl methacrylate |

After completion of feed 3 and 4, the polymerization mixture was allowed to react for 15 minutes at 87° C.; then 20.5 g of a 1.2% b.w. aqueous solution of sodium peroxodisulfate were added in 15 minutes. Subsequently, 3.4 g of a 25% b.w. aqueous solution of ammonia were added within 10 minutes and stirred in; 21.8 g of deionized water were added and stirred for another 60 minutes at 82° C. After that, 4.3 g of a 25% b.w. aqueous ammonia solution and 6 g of deionized water were added; the mixture was cooled down to 22° C., and the aqueous polymerized dispersion was filtered via a 125 μm filter.

The obtained polymer latex had a solids content of 48.1%, a pH-value of 7.9 and an average particle size of 128 nm according to HDC.

4.9 Comparative Example C6

Example 1 was repeated with the following exceptions.
i. 64.2 g of emulsifier 1 in the initial charge were replaced by 128.2 g of emulsifier 5.
ii. 47.2 g of emulsifier 2 in feed 2 were replaced by 103.8 g of emulsifier 5.
iii. 17.9 g of emulsifier 2 in feed 4 were replaced by 39.4 g of emulsifier 5.

The obtained polymer latex had a solids content of 45.2%, a pH-value of 8.0, and an average particle size of 71 nm according to HDC.

4.10 Example 4

Example 1 was repeated with the following exceptions.
i. 47.2 g of emulsifier 2 in feed 2 were replaced by 15.6 g of emulsifier 10.
ii. 17.9 g of emulsifier 2 in feed 4 were replaced by 5.9 g of emulsifier 10.

The obtained polymer latex had a solids content of 44.4%, a pH-value of 7.8, and an average particle size of 80 nm according to HDC.

4.11 Example 5

Example 1 was repeated with the following exceptions.
i. 64.2 g of emulsifier 1 in the initial charge were replaced by 19.3 g of emulsifier 8.
ii. 47.2 g of emulsifier 2 in feed 2 were replaced by 15.6 g of emulsifier 10.
iii. 17.9 g of emulsifier 2 in feed 4 were replaced by 5.9 g of emulsifier 10.

The obtained polymer latex had a solids content of 44.2%, a pH-value of 7.9, and an average particle size of 96 nm according to HDC.

4.12 Example 6

Example 1 was repeated with the following exceptions.
i. 64.2 g of emulsifier 1 in the initial charge were replaced by 19.3 g of emulsifier 9.

The obtained polymer latex had a solids content of 44.2%, a pH-value of 7.6, and an average particle size of 80 nm according to HDC.

4.13 Example 7

Example 1 was repeated with the following exceptions.
i. 64.2 g of emulsifier 1 in the initial charge were replaced by 19.3 g of emulsifier 8.

The obtained polymer latex had a solids content of 45.1%, a pH-value of 0.7.6 and an average particle size of 78 nm according to HDC.

4.14 Comparative Example C7

In a polymerization vessel equipped with metering devices and a temperature control, at 22° C.,
701.3 g Deionized water and
30.8 g Emulsifier 5
were added in a nitrogen atmosphere and heated to 80° C. whilst being stirred. At 80° C., feed 1 was added all at once and the mixture was stirred for 2 minutes. Then feed 2 was started and metered into the reaction vessel within 40 minutes, while maintaining a temperature of 80° C. After the end of feed 2, postpolymerization was effected for 10 minutes. Then, 1.9 g of 25% b.w. aqueous ammonia was added and the mixture was stirred for 10 minutes. Then feed 3 was started and metered into the reaction vessel within 90 minutes with constant feed rate while maintaining a temperature of 80° C. 1.9 g of 25% b.w. aqueous ammonia was added 45 minutes after having started feed 3. At this point of time, feed 4 was started and metered into the reaction vessel within 45 minutes with constant feed rate while maintaining a temperature of 80° C.

Feed 1:

| | |
|---|---|
| 70.0 g | 7% b.w. aqueous solution of sodium peroxodisulfate |

Feed 2 (emulsion comprising):

| | |
|---|---|
| 140.1 g | Deionized water |
| 9.3 g | Emulsifier 5 |
| 16.8 g | Methacrylic acid |
| 126.0 g | 15% b.w. aqueous solution of methacrylamide |
| 237.2 g | Methyl methacrylate |
| 49.0 g | n-Butyl acrylate |
| 22.5 g | 25% b.w. solution of ureido methacrylate in methyl methacrylate |
| 168.0 g | 20% b.w. aqueous solution of diacetone acrylamide |
| 11.2 g | 2-Ethylhexyl thioglycolat |

Feed 3 (emulsion comprising):

| | |
|---|---|
| 404.0 g | Deionized water |
| 9.3 g | Emulsifier 5 |
| 315.0 g | n-Butyl acrylate |
| 266.0 g | 2-Ethylhexyl acrylate |
| 140.0 g | n-Butyl methacrylate |
| 259.0 g | Methyl methacrylate |

Feed 4:

| | |
|---|---|
| 10.0 g | 7% b.w. aqueous solution of sodium peroxodisulfate |

After completion of feed 3 and 4, the polymerization mixture was allowed to react at 80° C. for 90 minutes; then 5.3 g of a 25% b.w. aqueous solution of ammonia were added within 15 minutes with stirring. While being stirred, the mixture was cooled down to 22° C. At a temperature ≤40° C., 140.0 g of a 12% b.w. aqueous solution of adipic dihydrazide was added. Afterwards, the aqueous polymer dispersion was filtered off via a 125 μm filter.

The obtained polymer latex had a solids content of 42.7%, a pH-value of 8.0 and a particle size of 78 nm according to HDC.

4.15 Example 8

Comparative example C7 was repeated with the following exceptions.
  i. 30.8 g of emulsifier 5 in the initial charge were replaced by 35.0 g of emulsifier 1. The amount of deionized water in the initial charge was increased from 701.3 g to 718.2 g.
  ii. 9.3 g of emulsifier 2 in feed 1 were replaced by 8.75 g of emulsifier 2.
  iii. 9.3 g of emulsifier 2 in feed 3 were replaced by 8.75 g of emulsifier 2.

The obtained polymer latex had a solids content of 42.8%, a pH-value of 8.1 and a particle size of 78 nm according to HDC.

4.16 Example 9

Comparative example C7 was repeated with the following exceptions.
  i. 30.8 g of emulsifier 5 in the initial charge were replaced by 32.8 g of emulsifier 2. The amount of deionized water in the initial charge was increased from 701.3 g to 719.6 g.
  ii. 9.3 g of emulsifier 2 in feed 1 were replaced by 9.3 g of emulsifier 1.
  iii. 9.3 g of emulsifier 2 in feed 3 were replaced by 9.3 g of emulsifier 1.

The obtained polymer latex had a solids content of 43.0%, a pH-value of 8.0 and a particle size of 75 nm according to HDC.

5. Application Tests 5.1 Testing of Stability of Polymer Latexes Against Polyvalent Metal Salts (Test Procedure 1)

Different amounts of an aqueous solution of $ZnSO_4$ (480 mmol/l) were added to a sample of the respective polymer dispersion. After 16 hours of storage at 22° C., the particle size (PS) was measured by means of QELS (Zetasizer Nano by Malvern). The concentration was recorded at which the particle size increased significantly (at least 2 times) compared to the starting value. The results are summarized in the following table 1.

TABLE 1

Stability of the Polymer Latexes against $ZnSO_4$

| Example | Emulsifier: Initial | Emulsifier: Feed | Initial PS (nm) | Addition of salt ($ZnSO_4$) Concentration (mmol/l) | Addition of salt ($ZnSO_4$) PS (nm) |
|---|---|---|---|---|---|
| 1 | 1 | 2 | 95 | 17.5 | 250 |
| C1 | 3 | 3 | 90 | 5 | 295 |
| C2 | 3 | 2 | 90 | 8 | 250 |
| C3 | 1 | 1 | 95 | 8.5 | 250 |
| 2 | 1 | 2 | 95 | 11 | 500 |
| C4 | 4 | 2 | 85 | 5.5 | 500 |
| 3 | 1 | 2 | 103 | 24 | 500 |
| C5 | 5 | 6 + 7 | 128 | 1 | 500 |
| C6 | 5 | 5 | 85 | 10 | 1790 |
| 1 | 1 | 2 | 95 | 10 | 94 |

TABLE 1-continued

Stability of the Polymer Latexes against $ZnSO_4$

| Example | Emulsifier: Initial | Emulsifier: Feed | Initial PS (nm) | Addition of salt ($ZnSO_4$) Concentration (mmol/l) | Addition of salt ($ZnSO_4$) PS (nm) |
|---|---|---|---|---|---|
| 4 | 1 | 10 | 103 | 10 | 247 |
| 5 | 8 | 10 | 113 | 10 | 137 |
| 6 | 9 | 2 | 93 | 10 | 91 |
| 7 | 8 | 2 | 91 | 10 | 104 |

5.2 Testing of Stability of Polymer Latexes Against Polyvalent Metal Salts (Test Procedure 2)

Firstly, stock solutions of zinc sulfate in deionized water having a defined concentration of $ZnSO_4$ of 0.1% by weight (c=6.2 mM) and 0.05% by weight (3.1 mM) are prepared. A test tube is filled with the respective stock solution to a height of approx. 2 cm. Then one drop of the polymer latex to be tested is dropped into the test solution, and the sample is lightly shaken before evaluation. The test sample is then visually evaluated with the naked eye with regard to the formation of coagulum and rated according to the following grades. The results are summarized in the following table 2:
  + the polymer latex mixes completely without formation of coagulum. No coagulum can be observed when the test tube is illuminated by means of a LED torch;
  −/+ no coagulum can be observed in daylight. However, formation of slight amounts of coagulum can be observed, when the when the test tube is illuminated by means of a LED torch;
  − The immediate formation of coagulum is observed in daylight without using a torch.

TABLE 2

| Example | Emulsifier: Initial | Emulsifier: Feed | Initial PS (nm) | Stability against $ZnSO_4$ 6.2 mM | Stability against $ZnSO_4$ 3.1 mM |
|---|---|---|---|---|---|
| 1 | 1 | 2 | 95 | + | + |
| C7 | 5 | 5 | 78 | − | −/+ |
| 8 | 1 | 2 | 78 | −/+ | + |
| 9 | 2 | 1 | 75 | + | + |

5.3 Testing of Application Properties of Waterborne Coating Compositions

For testing the application properties of waterborne coating compositions containing the polymer latexes of examples 1 to 3 and of comparative examples C1 to C5, paint formulations were formulated using the following recipe:

| | parts by weight |
|---|---|
| Demineralized water | 80 |
| Dispersant | 10 |
| Thickener | 20 |
| Defoamer | 5 |
| $TiO_2$-Pigment | 162 |
| Filler/Extender 1 | 50 |
| Filler/Extender 2 | 45 |
| Reactive pigment* | 20 |

*zinc white RS of Grillo Werke AG

The above mixture was dispersed for approx. 20 min. Then the following ingredients were added:

|  | parts by weight |
|---|---|
| Film former | 15 |
| Aqueous polymer latex (45%) | 500 |
| Thickener |  |
| Demineralized water | 93 |
| Total | 1000 |

Properties of the Paint Formulation:

|  |  |
|---|---|
| Solids content (metered) (% b.w.) | 52.9 |
| Volume TiO$_2$ (mL) | 39.5 |
| Volume Filler/Extender (mL) | 38.8 |
| Total Volume of Inorganic Ingredients (mL) | 78.3 |
| Volume Latex Polymer (mL) | 211.5 |
| PVC | 27 |

5.2.1 Storage Stability Test by Means of a Stormer Type Viscometer

A single point viscosity measurement was carried out according to ASTM D562 using a Stormer type viscometer measuring Krebs Units (KU). One set of measurements on the different samples in the examples were carried out 24 h after paint manufacture, the other after storing the paint sample in a closed container at 50° C. for 14 days. A difference between the two measurements of less than 5 KU units indicates good storage stability and compatibility.

5.2.2 Tannin Blocking Effect, Film Formation and Compatibility

This test helps to determine the tannin blocking capability and film building properties of paints on an MDF (69 cm*41 cm, 1.5 cm diameter). Different tannin concentrations are applied on the MDF. 5 different concentrations are made with Tannin (high-purity grade) by Roth, Art. No. 4239.1 in demineralized water: 2.5%, 5%, 10%, 15%, and 20%. All solutions are enriched with 0.3% Betolin® V30 for enhanced squeegeeing purposes. These solutions are applied next to each other on the same MDF with a doctor blade and a 60 mµ wet layer. They are allowed to dry for 24 hrs at 22° C. and a humidity of 55%. Then a doctor blade is used to apply 300 mµ of the white paint to be tested diagonally on the strips with different tannin concentrations. The changes in color are assessed relative to the zero value (without or 0% tannin) on the larger area of the strip.

This is done as a ΔE comparison by means of a CIEL*a*b* measuring/metering device (ISO7724-2). ΔE<1 is desired, which would indicate a good tannin blocking. At a certain tannin concentration, film building failures may occur. The results are summarized in table 3.

TABLE 3

| Application results | | | | | | | |
|---|---|---|---|---|---|---|---|
| Polymer latex | KU Prior to storage | KU After storage | Syneresis | Cracks - tannic acid 10% | Cracks - tannic acid 15% | Delta E - tannic acid 10% | Delta E - tannic acid 15% |
| 1 | 107 | 111 | No | No | No | 0.6 | 0.7 |
| 2 | 121 | 122 | No | No | No | 0.5 | 0.6 |
| 3 | 108 | 112 | No | No | Yes | 0.8 | N/A |
| C1* | 117 | 136 | No | No | Yes | 1.9 | N/A |
| C2* | 112 | 123 | No | No | Yes | 1.6 | N/A |
| C3* | 115 | 127 | No | No | Yes | 1.3 | N/A |
| C4* | 109 | 113 | No | No | Yes | 0.8 | N/A |
| C5* | 121 | 132 | Yes, 7% | Yes | Yes | N/A | N/A |

*Polymer latex of Comparative Example

The invention claimed is:

1. An aqueous polymer latex of a film-forming copolymer obtainable by aqueous emulsion polymerisation of monomers M, which comprise at least 80% by weight, based on the monomers M, of
   at least one non-ionic monomer M1, which is selected from $C_1$-$C_{20}$-alkyl esters of acrylic acid, $C_5$-$C_{20}$-cycloalkyl esters of acrylic acid, $C_1$-$C_{20}$-alkyl esters of methacrylic acid, $C_5$-$C_{20}$-cycloalkyl esters of methacrylic acid, and monovinyl aromatic monomers; and
   one or more monoethylenically unsaturated monomers M2, which are selected from monoethylenically unsaturated monocarboxylic acids having 3 to 6 carbon atoms and monoethylenically unsaturated dicarboxylic acids having 4 to 6 carbon atoms;
   where the polymer latex contains an emulsifier combination comprising
   i. at least one first emulsifier (1), which is selected from salts of sulfated ethoxylated $C_8$-$C_{20}$-alkanols having a degree of ethoxylation in the range from 5 to 20 and sulfated ethoxylated tristyrylphenols having a degree of ethoxylation in the range from 5 to 20; and
   ii. at least one second emulsifier (2), which is selected from salts of a sulfated ethoxylated $C_8$-$C_{20}$-alkanol having a degree of ethoxylation in the range from 21 to 50 and sulfated ethoxylated tristyrylphenols having a degree of ethoxylation in the range from 21 to 50;
   wherein the aqueous polymer latex comprises a first phase of a film-forming copolymer, which has a glass transition temperature Tg(1) in the range from −25 to +60° C. and a second phase of a film-forming copolymer, which has a glass transition temperature Tg(2) in the range from +50 to +150° C., provided that the absolute value of |Tg(2)−Tg(1)| is at least 10° C.

2. The aqueous polymer latex of claim 1, wherein the first emulsifier (1) is selected from the alkali metal salts and ammonium salts of sulfated ethoxylated $C_8$-$C_{20}$-alkanols having a degree of ethoxylation in the range from 5 to 20.

3. The aqueous polymer latex of claim 1, wherein the second emulsifier (2) is selected from the alkali metal salts and ammonium salts of sulfated ethoxylated $C_8$-$C_{20}$-alkanols having a degree of ethoxylation in the range from 21 to 50.

4. The aqueous polymer latex of claim 1, wherein the weight ratio of the first emulsifier (1) to the second emulsifier (2) is in the range from 15:85 to 70:30.

5. The aqueous polymer latex of claim 1, wherein the total amount of emulsifiers present in the aqueous polymer latex is in the range from 0.1 to 5% by weight based on the film-forming copolymer.

6. The aqueous polymer latex of claim 1, wherein the first emulsifier and the second emulsifier amount to at least 90% by weight of the total amount of emulsifiers contained in the polymer latex.

7. The aqueous polymer latex of claim 1, wherein the particles of the copolymer contained in the polymer latex have a Z-average particle diameter in the range from 40 to 500 nm, as determined by quasi-elastic light scattering.

8. The aqueous polymer latex of claim 1, where the monomers M1 are a mixture of
   at least one monomer M1a, selected from $C_1$-$C_{20}$-alkyl esters of acrylic acid and $C_5$-$C_{20}$-alkyl esters of methacrylic acid; and
   at least one monomer M1b, selected from monovinyl aromatic monomers, and $C_1$-$C_4$-alkyl esters of methacrylic acid and mixtures thereof.

9. The aqueous polymer latex of claim 1, where the monomers M2 are selected from acrylic acid, methacrylic acid and mixtures thereof.

10. The aqueous polymer latex of claim 1, where the monomers M further comprise at least one monomer M3, which is selected from the group consisting of non-ionic monoethylenically unsaturated monomers which have a functional group selected from the group consisting of hydroxyalkyl groups, a primary carboxamide group, urea groups and keto groups.

11. The aqueous polymer latex of claim 1, where the monomers M consist of:
   85 to 99.95% by weight, based on the total weight of the monomers contained in the monomer composition M, of ethylenically unsaturated monomers M1;
   0.05 to 5% by weight, based on the total weight of the monomers contained in the monomer composition M, of one or more monoethylenically unsaturated monomers M2;
   0 to 14.95% by weight, based on the total weight of the monomers contained in the monomer composition M, of one or more non-ionic monomers M3.

12. The aqueous polymer latex of claim 1, which is obtainable by aqueous emulsion polymerisation of the monomers M in the presence of the emulsifier combination.

13. A process for producing an aqueous polymer latex of claim 1, which comprises performing an aqueous emulsion polymerisation of the monomers M in the presence of the emulsifier combination.

14. The process of claim 13, where the aqueous emulsion polymerization is a multistage aqueous emulsion polymerization, which comprises:
   i. a first stage of aqueous emulsion polymerizing a monomer composition $M^i$, which corresponds to a theoretical glass transition temperature $Tg'(i)$ according to Fox in the range from −25 to +60° C. to obtain a first stage polymer latex, and
   ii. a second stage of aqueous emulsion polymerizing a monomer composition $M^{ii}$, in the presence of the first stage polymer latex, where the monomer composition $M^{ii}$ corresponds to a theoretical glass transition temperature $Tg'(ii)$ according to Fox in the range from 50 to 150° C., provided that the temperature difference $Tg'(ii)-Tg'(i)$ is at least +10° C.

15. The process of claim 13, where the aqueous emulsion polymerization is a multistage aqueous emulsion polymerization, which comprises:
   i. a first stage of aqueous emulsion polymerizing a monomer composition $M^i$, which corresponds to a theoretical glass transition temperature $Tg'(i)$ according to Fox in the range from 50 to 150° C. to obtain a first stage polymer latex, and
   ii. a second stage of aqueous emulsion polymerizing a monomer composition $M^{ii}$, in the presence of the first stage polymer latex, where the monomer composition $M^{ii}$ corresponds to a theoretical glass transition temperature $Tg'(ii)$ according to Fox in the range from −25 to +60° C., provided that the temperature difference $Tg'(i)-Tg'(ii)$ is at least +10° C.

16. A waterborne coating composition comprising the aqueous polymer latex of claim 1, and at least one inorganic tannin blocking compound.

17. The coating composition of claim 16, where the inorganic tannin blocking compound is selected from the group consisting of oxides, phosphates and phosphosilicates of polyvalent metals, which are selected from zinc, aluminium, zirconium, barium and strontium.

18. The coating composition of claim 16, where the inorganic tannin blocking compound comprises zinc oxide.

19. The coating composition of claim 16, which further comprises a titanium dioxide pigment.

* * * * *